(12) United States Patent
Hasegawa et al.

(10) Patent No.: US 12,080,027 B2
(45) Date of Patent: Sep. 3, 2024

(54) ARTICLE POSITION MANAGING APPARATUS, ARTICLE POSITION MANAGEMENT SYSTEM, ARTICLE POSITION MANAGING METHOD, AND PROGRAM

(71) Applicant: NEC COMMUNICATION SYSTEMS, LTD., Tokyo (JP)

(72) Inventors: Takahiro Hasegawa, Tokyo (JP); Masahito Iwai, Tokyo (JP); Kenichi Abe, Tokyo (JP); Tetsuya Ito, Tokyo (JP); Chikashi Ito, Tokyo (JP)

(73) Assignee: NEC Communication Systems, LTD., Tokyo (JP)

( * ) Notice: Subject to any disclaimer, the term of this patent is extended or adjusted under 35 U.S.C. 154(b) by 495 days.

(21) Appl. No.: 17/414,590

(22) PCT Filed: Dec. 26, 2019

(86) PCT No.: PCT/JP2019/051259
§ 371 (c)(1),
(2) Date: Jun. 16, 2021

(87) PCT Pub. No.: WO2020/138345
PCT Pub. Date: Jul. 2, 2020

(65) Prior Publication Data
US 2022/0058826 A1 Feb. 24, 2022

(30) Foreign Application Priority Data

Dec. 27, 2018 (JP) .................... 2018-244356

(51) Int. Cl.
*G06T 7/73* (2017.01)
*G06V 20/56* (2022.01)

(52) U.S. Cl.
CPC ............... *G06T 7/74* (2017.01); *G06V 20/56* (2022.01); *G06T 2207/30204* (2013.01); *G06T 2207/30244* (2013.01)

(58) Field of Classification Search
CPC ............. G06T 7/74; G06T 2207/30204; G06T 2207/30244; G06T 2207/30208;
(Continued)

(56) References Cited

U.S. PATENT DOCUMENTS 5,640,243 A * 6/1997 Koitabashi ............... G03F 9/70
250/548
6,496,594 B1 * 12/2002 Prokoski ................ A61B 5/415
382/125
(Continued)

FOREIGN PATENT DOCUMENTS

CN 108369743 A 8/2018
CN 108734734 A 11/2018
(Continued)

OTHER PUBLICATIONS

Singapore Search Report for SG Application No. 11202106034Y, mailed on Jan. 4, 2023.
(Continued)

*Primary Examiner* — Kathleen Y Dulaney
(74) *Attorney, Agent, or Firm* — Sughrue Mion, PLLC

(57) ABSTRACT

Provided is an article position management apparatus that a receiver receives image data from a camera apparatus and that identifies a position of an article, based on an article marker attached to an article and a reference point marker whose coordinate information in an absolute coordinate system in a field is set in advance, the article marker and the reference point marker being included in the image data, when the camera apparatus is a mobile camera apparatus, and identifies the position of the article, based on the article
(Continued)

marker included in the image, when the camera apparatus is a fixed camera apparatus.

19 Claims, 21 Drawing Sheets

(58) Field of Classification Search
CPC ... G06T 7/73; G06T 2207/30164; G06T 7/70; G06T 2207/10021; G06T 2207/10028; G06V 20/56; G06V 10/25; G06V 10/245; B65G 1/137; G01B 11/00; G06K 7/10861; H04N 23/90
USPC .................................................. 382/154, 103
See application file for complete search history.

(56) References Cited

U.S. PATENT DOCUMENTS

| | | | |
|---|---|---|---|
| 6,594,600 | B1 | 7/2003 | Arnoul et al. |
| 2003/0012425 | A1* | 1/2003 | Suzuki ............... G02B 27/0093 348/E13.05 |
| 2008/0122869 | A1* | 5/2008 | Aratani .................. G06T 7/246 345/633 |
| 2009/0287587 | A1 | 11/2009 | Bloebaum et al. |
| 2010/0017178 | A1* | 1/2010 | Tsuk ........................ G06T 7/73 701/300 |
| 2010/0172567 | A1* | 7/2010 | Prokoski ................ A61B 5/411 348/47 |
| 2011/0087497 | A1 | 4/2011 | Avallone et al. |
| 2011/0235054 | A1 | 9/2011 | Koike et al. |
| 2011/0262053 | A1* | 10/2011 | Strandemar ............... G06T 5/50 348/E5.09 |
| 2012/0070043 | A1* | 3/2012 | Higuchi ................ G06T 1/0021 382/124 |
| 2015/0049187 | A1 | 2/2015 | Van Der Sluijs et al. |
| 2016/0063821 | A1* | 3/2016 | MacIntosh ............. G06Q 30/00 705/23 |
| 2016/0321530 | A1* | 11/2016 | Troy ...................... G06Q 10/02 |
| 2017/0132842 | A1* | 5/2017 | Morrison ............ G06F 3/04815 |
| 2017/0249745 | A1* | 8/2017 | Fiala ........................ A63F 13/65 |
| 2018/0028063 | A1* | 2/2018 | Elbaz ....................... A61B 1/24 |
| 2018/0189565 | A1 | 7/2018 | Lukierski et al. |
| 2018/0232686 | A1* | 8/2018 | Yasunaga ............... G06V 20/63 |
| 2019/0025852 | A1* | 1/2019 | Nanda .................. G06Q 10/087 |
| 2019/0096080 | A1* | 3/2019 | Liu ............................ G06T 7/70 |
| 2019/0156086 | A1* | 5/2019 | Plummer ................ G06T 7/248 |
| 2019/0265722 | A1* | 8/2019 | Haeusler ............... G05D 1/0234 |
| 2020/0025553 | A1 | 1/2020 | Tokura et al. |
| 2020/0041250 | A1* | 2/2020 | Ikebuchi ................ G01B 5/008 |
| 2020/0074676 | A1* | 3/2020 | Nomasa ..................... G06T 7/74 |
| 2021/0233256 | A1* | 7/2021 | Sundaram ................. G06T 7/73 |
| 2022/0058826 | A1 | 2/2022 | Hasegawa et al. |
| 2023/0092401 | A1* | 3/2023 | Plummer ........... G06K 7/10722 235/462.41 |

FOREIGN PATENT DOCUMENTS

| | | | | |
|---|---|---|---|---|
| CN | 113226952 | B | 4/2023 | |
| JP | 2001506369 | A | 5/2001 | |
| JP | 2001330411 | A | 11/2001 | |
| JP | 2007-48068 | A | 2/2007 | |
| JP | 2010119117 | A | 5/2010 | |
| JP | 2011133313 | A | 7/2011 | |
| JP | 2011203148 | A | 10/2011 | |
| JP | 2015048171 | A | 3/2015 | |
| JP | 2015518138 | A | 6/2015 | |
| JP | 2015225014 | A | 12/2015 | |
| JP | 2017-130047 | A | 7/2017 | |
| JP | 2017214197 | A | 12/2017 | |
| JP | 2018-116572 | A | 7/2018 | |
| JP | 2018169698 | A | 11/2018 | |
| WO | WO-2006065563 | A2 * | 6/2006 | ............ B66F 9/0755 |
| WO | 2012157055 | A1 | 11/2012 | |
| WO | 2018066614 | A1 | 4/2018 | |

OTHER PUBLICATIONS

International Search Report for PCT Application No. PCT/JP2019/051259, mailed on Mar. 17, 2020.
OpenCV, "Camera Calibration", OpenCV-Python Tutorials 1 documentation, OpenCV-Python tutorial, Camera Calibration and 3D Recovery, Searched on Feb. 19, 2021, pp. 1-7, Japan, [Online] http://opencv.jp/opencv-2.1/cpp/camera_calibration_and_3d_reconstruction.html#cv-calibratecamera.
Opencv, "Calibration camera and 3D reconstruction", opencv v2.1 documentation, cv. Image Processing and Computer Vision, Searched on Feb. 19, 2021, pp. 1-16, Japan, [Online] http://opencv.jp/opencv-2.1/cpp/camera_calibration_and_3d_reconstruction.html.
Tanaka Hideyuki et al., "High precision AR marker using a microlens array", National Institute of Advanced Industrial Science and Technology(AIST), Service Robotics Research Group, pp. 1-3, Japan, [Online] The URL to this source can be found in paragraph [0196] of the specification of this application.
Chinese Office Action for CN Application No. 201980086029.7 mailed on May 23, 2022 with English Translation.
Communication dated May 31, 2023 issued by the Japanese Intellectual Property Office in counterpart Japanese Application No. 2020-562439.
Hirokazu Kato et al., "An Augmented Reality System and its Calibration based on Marker Tracking", The Virtual Reality Society of Japan, TVRSJ, vol. 4. No. 4, 1999, 10 pages total.
Japanese Office Action for JP Application No. 2020-562439 mailed on Dec. 13, 2022 with English Translation.
VN Office Action for VN Application No. 1-2021-04612, mailed on Aug. 29, 2023 with English Translation.

* cited by examiner

FIG. 7

REFERENCE POINT MARKER INFORMATION

| IDENTIFIER | ABSOLUTE POSITION | ABSOLUTE DIRECTION | SIZE |
|---|---|---|---|
| P_01 | (x01, y01, z01) | M_01 | S_01 |
| P_02 | (x02, y02, z02) | M_02 | S_02 |
| P_03 | (x03, y03, z03) | M_03 | S_03 |
| ... | ... | ... | ... |

FIG. 8

ARTICLE MARKER INFORMATION

| ARTICLE IDENTIFIER | MARKER IDENTIFIER | SIZE |
|---|---|---|
| B_11 | P_11 | S_11 |
| B_12 | P_12 | S_12 |
| B_13 | P_13 | S_13 |
| ... | ... | ... |

FIG. 9

CAMERA RELATED INFORMATION

| CAMERA APPARATUS IDENTIFIER | TYPE | ANGLE OF VIEW, DISTORTION | ABSOLUTE POSITION | ABSOLUTE DIRECTION |
|---|---|---|---|---|
| ID_01 | MOBILE | (θ01, D01) | - | - |
| ID_02 | MOBILE | (θ02, D02) | - | - |
| ... | ... | ... | ... | ... |
| ID_11 | FIXED | (θ11, D11) | (x11, y11, z11) | M_11 |
| ID_12 | FIXED | (θ12, D12) | (x12, y12, z12) | M_12 |
| ... | ... | ... | ... | ... |

FIG. 10

| ARTICLE POSITION INFORMATION ||
|---|---|
| ARTICLE IDENTIFIER | ABSOLUTE POSITION |
| B_21 | (x21, y21, z21) |
| B_22 | (x22, y22, z22) |
| B_23 | (x23, y23, z23) |
| ... | ... |

ARTICLE POSITION MANAGING APPARATUS, ARTICLE POSITION MANAGEMENT SYSTEM, ARTICLE POSITION MANAGING METHOD, AND PROGRAM

This application is a National Stage Entry of PCT/JP2019/051259 filed on Dec. 26, 2019, which claims priority from Japanese Patent Application 2018-244356 filed on Dec. 27, 2018, the contents of all of which are incorporated herein by reference, in their entirety.

FIELD

Reference to Related Application

The present invention is based upon and claims the benefit of the priority of Japanese patent application No. 2018-244356, filed on Dec. 27, 2018, the disclosure of which is incorporated herein in its entirety by reference thereto.
The present invention relates to an article position management apparatus, article position management system, article position management method, and non-transitory medium storing a program.

BACKGROUND

At a production site such as a factory or the like, it is important to manage a position of an article such as a material to be used. This is because it is essential to find a required material promptly for smooth factory operation. As a method that implements such position management of an article, there is a method that includes: obtaining a position of a mobile body carrying an article(s); and recording the position of the mobile body when the article is located, and an identifier of the article, in association with each other.

As a method for obtaining a position of a mobile body, there is known absolute position estimation which obtains an absolute position. Absolute position estimation includes satellite positioning (Global Positioning System (GPS) positioning), positioning using a wireless radio signal, and using a landmark (mark or feature) that can be recognized by a camera as a reference point.

Satellite positioning (GPS positioning) has an advantage in that it can be used easily as long as a signal receiver is available. On the other hand, it has a disadvantage that indoors with the satellite in a blind spot, the signal receiver cannot receive a signal from the satellite and does not work.

Hence, there is a case where a position measurement method based on proximity positioning or triangulation using a strength of a wireless radio signal (beacons) (RSSI; Received Signal Strength Indicator) is used. In addition, an article position measurement using beacons can be used to measure not only a position of a mobile body, but also a position of an article itself.

Patent Literature 1 (PTL 1) describes a technology that simplifies an operation of registering position information and orientation information of an asset in a database. The system disclosed in PTL 1 includes a marker attached to an asset, an asset management server that holds location information and direction information of a reference asset along with ID information of a marker attached to the reference asset, and an operation terminal that registers location information and direction information of an unregistered asset on the asset management server.

PTL 2 discloses an estimation apparatus, estimation method, and estimation program, each being able to estimate an object coordinate system, which indicates 3D position and posture of an object, with high accuracy.

PTL 1: International Publication WO2012/157055
PTL 2: Unexamined Patent Application Publication No. JP2011-203148A

SUMMARY

The disclosures of the above NPL 1 and 2 are incorporated herein by reference thereto. The following analysis has been made by present inventors.

As described above, article position management is important in a factory, or the like. As a method implementing article position management, there is a method using a radio signal (beacons). However, this method has some problems.

More specifically, a means of receiving beacons is required for each article to be managed. Thus, if a huge number of articles are to be managed, a large amount of cost is needed. Further, there is a problem that in a position measurement of an article using beacons, a positioning error is large. The technology disclosed in PTL 1 requires a human operated terminal. This makes it difficult to apply the technology to the article position management in a production site with a large area such as a factory, or the like.

It is a main object of the present invention to provide an article position management apparatus, an article position management system, an article position management method, and a non-transitory medium storing a program, each contributing to accurate and low-cost article position management.

According to a first aspect of the present invention or disclosure, there is provided an article position management apparatus which includes: an input part that receives image data from a camera apparatus; and an identification part that identifies a position of an article based on an article marker attached to the article and a reference point marker whose coordinate information in an absolute coordinate system in a field is set in advance, the article marker and the reference point marker being included in the image data, when the camera apparatus is a mobile camera apparatus, and identifies the position of the article based on the article marker included in the image data when the camera apparatus is a fixed camera apparatus.

According to a second aspect of the present invention or disclosure, there is provided an article position management system, including: a means that shoots a reference point marker whose coordinate information in an absolute coordinate system in a field and an article marker attached to an article to generate image data; a means that extracts the reference point marker and the article marker from the image data; a means that identifies a position of the article, based on the reference point marker and the article marker, when the image data is generated by a mobile camera apparatus; and a means that identifies a position of the article, based on the article marker when the image data is generated by a fixed camera apparatus.

According to a third aspect of the present invention or disclosure, there is provided an article position management method for an article position management apparatus, the method including:
receiving image data from a camera apparatus;
identifying an article position based on an article marker attached to an article and a reference point marker whose coordinate information in an absolute coordinate system in a field is set in advance, the article marker and the reference point marker being included in the image data, when the camera apparatus is a mobile camera apparatus; and identifying the position of the article based on the article marker included in the image, when the camera apparatus is a fixed camera apparatus.

According to a fourth aspect of the present invention or disclosure, there is provided a program causing a computer installed on an article position management apparatus to perform processing including:

receiving image data from a camera apparatus;

identifying an article position based on an article marker attached to an article and a reference point marker whose coordinate information in an absolute coordinate system in a field is set in advance, the article marker and the reference point marker being included in the image data, when the camera apparatus is a mobile camera apparatus; and identifying the position of the article based on the article marker included in the image, when the camera apparatus is a fixed camera apparatus.

The above-mentioned program can be recorded in a computer-readable storage medium. The storage medium may be a non-transient (or non-transitory) medium such as a semiconductor memory, a hard disk, a magnetic recording medium, or an optical recording medium. The present invention can be implemented as a computer program product.

According to the present invention, there are provided an article position management apparatus, an article position management system, an article position management method, and a non-transitory medium storing a program that contribute to accurate and low-cost article position management.

BRIEF DESCRIPTION OF THE DRAWINGS

FIG. 7 is a diagram illustrating an example of reference point marker information.

FIG. 8 is a diagram illustrating an example of article marker information.

FIG. 9 is a diagram illustrating an example of camera related information.

FIG. 10 is a diagram illustrating an example of article position information.

DETAILED DESCRIPTION

First, an outline of an example embodiment will be described. In the following outline, various components are attached with reference signs for the sake of convenience. Namely, the following reference signs are merely used as examples to facilitate understanding of the outline. Thus, the disclosure of the outline is not intended to limit in any way. In addition, connecting lines between blocks in each Fig. include both bidirectional and unidirectional. One-way arrow schematically shows a flow of a main signal (data) and does not exclude bidirectionality. Also, in a circuit diagram, a block diagram, an internal configuration diagram, a connection diagram, etc., there are an input port and an output port at input end and output end of connection line respectively, although not explicitly disclosed. The same applies for an I/O interface.

Figure 1:
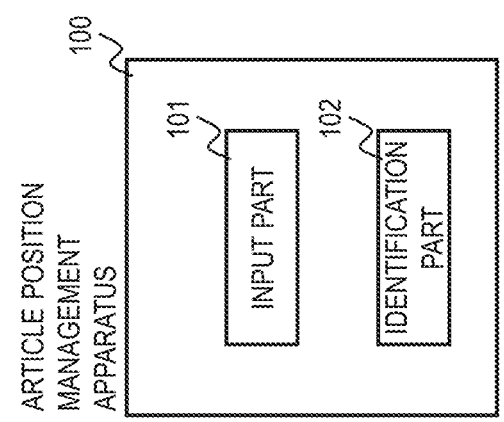
FIG. 1 is a diagram illustrating an outline of an example embodiment.

An article position management apparatus 100 according to an example embodiment comprises an input part 101 and an identification part 102 (see FIG. 1). The input part receives image data from a camera apparatus. The identification part identifies article position based on an article marker attached to an article and a reference point marker whose coordinate information in an absolute coordinate system in a field is set in advance, the article marker and the reference point marker being included in the image data, when the camera apparatus is a mobile camera apparatus. Furthermore, the identification part identifies the article position based on the article marker included in the image when the camera apparatus is a fixed camera apparatus.

The article position management apparatus 100 switches over a method of calculating an absolute position of an article according to a type of a camera apparatus. More specifically, when the camera apparatus is a mobile type, the article position management apparatus 100 extracts a reference point marker and an article marker in one image and uses these markers to identify a position of the article. In contrast, when the camera apparatus is a fixed type, the article position management apparatus 100 extracts the article marker in one image and uses the marker to identify a position of the article. In this way, a position of an article can be accurately identified by switching over the method of identifying the position of the article according to a type of the camera apparatus. More specifically, the camera apparatus moves and captures image up to every corner of a field. This allows the camera to accurately identify a position of an article, whose accurate position cannot be identified by a fixed camera apparatus due to blind spots. In addition, by using a fixed camera apparatus to capture pinpoint image of an area where a position of an article changes frequently, it is possible to grasp a movement of the article in real time, while the movement of articles cannot be instantly grasped by a mobile camera apparatus. Furthermore, use of a printed material as a marker to identify a position of an article makes it possible to prepare necessary components at a much lower cost than beacon receivers. Therefore, unlike the article position management using beacons, low-cost and accurate article position management can be performed.

In the following, specific embodiments will be described in more detail with reference to the drawings. The same sign is attached to the same element in each embodiment, with the description thereof omitted.

First Example Embodiment

A first example embodiment will be described in more detail with reference to the drawings.

Figure 2:
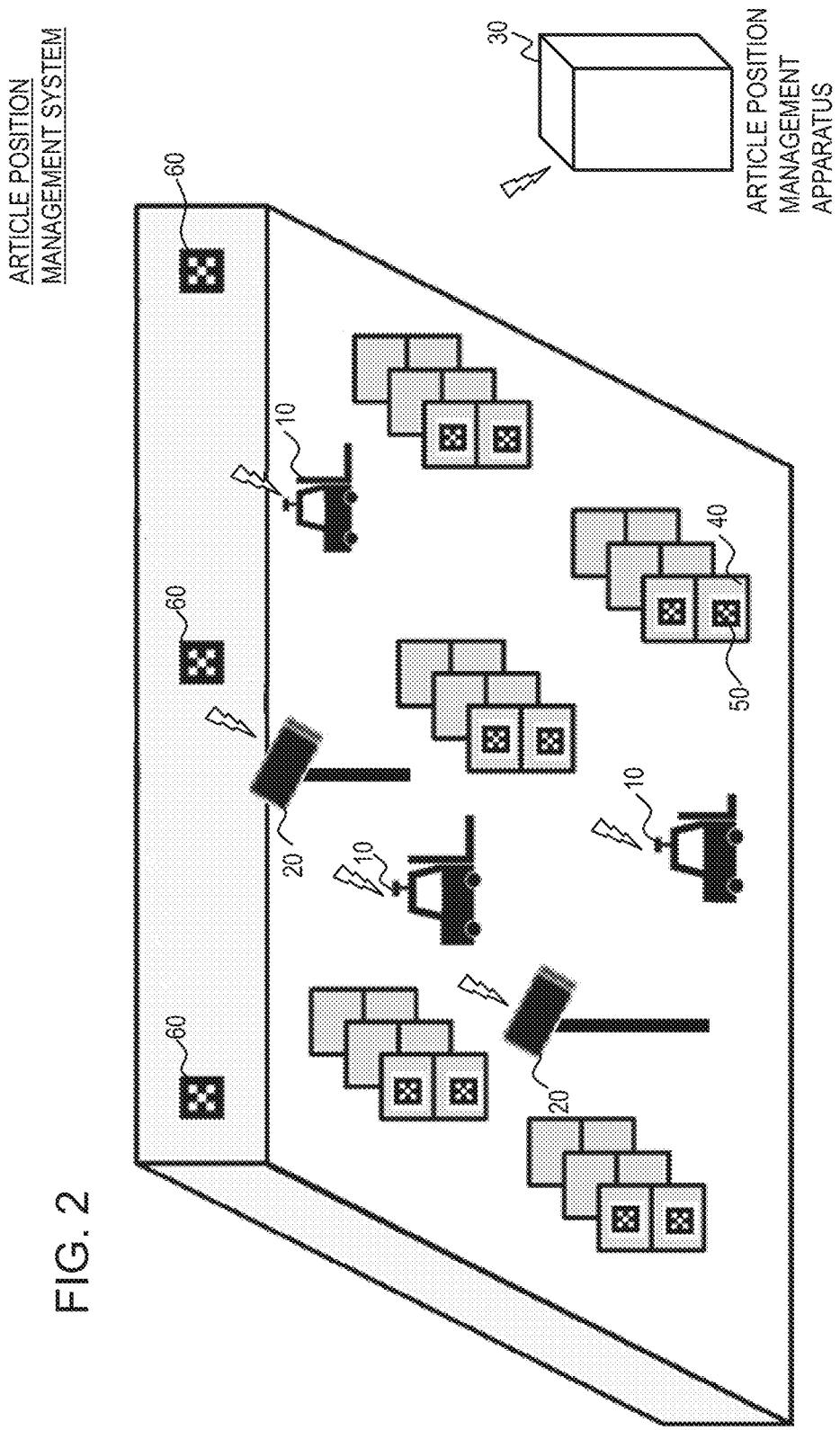
FIG. 2 is a diagram illustrating an example of schematic configuration of an article position management system according to a first example embodiment.

FIG. 2 is a diagram illustrating an example of schematic configuration of an article position management system according to a first example embodiment. Referring to FIG. 2, the article position management system includes a plurality of mobile camera apparatuses 10, a plurality of fixed camera apparatuses 20, and an article position management apparatus 30.

In the first example embodiment, the mobile camera apparatus 10 is installed on a mobile body such as a forklift truck. The forklift is operated by a worker to pick up an article, place the article, and so forth.

Note that the mobile camera apparatus 10 is only required to be able to change its position in a field. For example, the mobile camera apparatus 10 may be a camera apparatus that moves on a rail laid on a ceiling, or a camera may be installed on a robot that patrols the field. The article position management system may also include multiple types of mobile camera apparatus 10 according to various modes described above. For example, there may be a mixture of a mobile camera apparatus 10 mounted on an article transporting means, such as a forklift, and a mobile camera apparatus 10 mounted on a patrolling robot.

The fixed camera apparatus 20 is a camera that is fixed to a pillar or ceiling of the field. The fixed camera apparatus 20 is installed to capture image of a predetermined area in the field.

The mobile camera apparatus 10, the fixed camera apparatus 20, and the article position management apparatus 30 are configured to connect by wire or wirelessly to have communication with each other (sending and receiving data). In the following description, a "camera apparatus" simply denoted without any special explanation refers to the mobile camera apparatus 10 or the fixed camera apparatus 20.

In the first embodiment, the article position management apparatus 30 identifies and manages a position of an article placed in a field based on information (data) transmitted from the camera apparatus.

As illustrated in FIG. 2, the field contains a plurality of articles 40. The article 40 is, for example, a container stacked on a pallet, a cardboard box or boxes, a machine, devices, etc. Each of the plurality of articles 40 placed in the field is marked with an article marker 50. The article marker 50 attached to each article is managed so that there is no duplicates, and there is a one-to-one correspondence between the article 40 and the article marker 50. That is, if the article marker 50 is uniquely identified and a position of the article marker 50 is identified, it follows that a position of the article 40 is identified.

The article marker 50 can be detected by a camera mounted on a camera apparatus and serves as an identifier (marker) that enables calculation of a relative position of the marker to the camera apparatus. For example, an augmented reality (AR) marker can be used as the article marker 50. It is noted that the article marker 50 is not limited to the AR marker and any marker can be used as long as the marker is detectable by a camera and a relative position between the camera and the marker can be calculated.

As illustrated in FIG. 2, a plurality of reference point markers 60 are provided in the field. The AR marker can also be used for the reference point marker 60. Each of the article marker 50 and the reference point marker 60 can use a printed marker. A printed AR marker can be attached to the article 40 or to a preset position in the field.

As described above, the article marker 50 and the reference point marker 60 are identifiers that enable to calculate a relative position of each of the markers to the camera apparatus. To calculate the relative position, a method of solving a Perspective-n-Point (PnP) problem (hereinafter referred to as the PnP method) can be used. That is, each relative position of the reference point marker 60 and the article marker 50 is calculated as a solution to the PnP problem.

The following outlines identification of an AR marker and calculation of a relative position using the AR marker.

Figure 3:
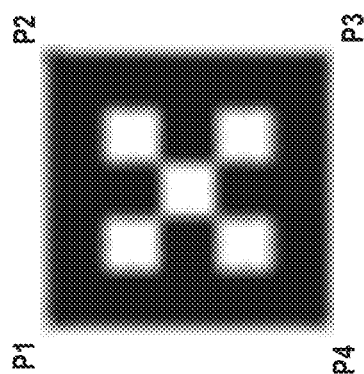
FIG. 3 is a diagram illustrating an example of an AR (Augmented Reality) marker.

FIG. 3 is a diagram illustrating an example of an AR marker. A predetermined pattern is printed within a black frame on the AR marker, as illustrated in FIG. 3. It is possible to identify the AR marker by performing image processing on image data obtained by capturing the AR marker.

More specifically, presence of the AR marker itself can be grasped by detecting a black frame included in the image data, and the AR marker is uniquely identified by a pattern within the black frame. More specifically, an area within the black frame of the AR marker is divided into multiple areas and a pattern file is prepared in advance that quantifies (or digitizes) image in each divided area. The AR marker is uniquely identified by comparing a pattern extracted from the image data captured by the camera with the pattern file prepared in advance.

In order to apply the PnP method to the AR marker, three or more coordinates in the 3D coordinate system and three or more coordinates of 2D image corresponding to the three or more coordinates in the 3D coordinate system are required. In the first example embodiment, four corner vertices P1 to P4 of the AR marker are used, as the above feature points.

For many AR markers, a method to obtain vertex coordinates of four corners of a detected marker on the 2D image has been established. Therefore, by recording a position (location), orientation (direction), and size of the marker when installing the AR marker, vertex coordinates of four corners of the AR marker in the 3D coordinate system can be obtained. A size is a length of one side if the AR marker is square, or vertical and horizontal length if the AR marker I is rectangular.

It is noted that in the first example embodiment, four corners of AR markers are used as feature points, but the feature points do not necessarily have to be vertices of the four corners. When feature points other than the four corners are used, information that enables to obtain coordinates of the feature point in the 3D coordinate system may be recorded.

A reference point marker 60 has a single coordinate information (absolute position, and absolute orientation (direction)) and a marker size. For example, in FIG. 2, three reference point markers 60 are illustrated, each of which has different coordinate information. As for a size of the reference point marker 60 (marker size), the size of each marker may be the same or different. Any size can be used as long as the size of each marker is determined in advance.

An absolute position included in coordinate information that each reference point marker 60 has is a coordinate in an absolute coordinate system with an arbitrary position (e.g., an entrance) as an origin. Alternatively, an absolute position included in a coordinate information may be expressed using longitude and latitude. An absolute orientation (direction) included in the coordinate information that the reference point marker 60 has is an orientation (direction) (expressed as an angle to each of the three axes) of the coordinate system (absolute coordinate system) based on the above origin. That is, absolute position and absolute orientation are position and orientation in a coordinate system with an origin preset in advance.

The PnP method using the coordinate information (absolute position, absolute orientation) and a size of reference point marker 60 makes it possible to calculate position and orientation of the camera that recognize the reference point marker 60.

The following section outlines a solution to the PnP problem.

In order to solve the PnP problem, information about a view angle and a distortion of a camera which captured image data is required. In more detail, data called "camera matrix" and "distortion coefficient vector" are required.

The camera matrix is a three-dimensional square matrix (matrix A below) including focal length fx and fy each expressed in a pixel unit, and a principal point (cx,cy) which is usually an image center.

$$A = \begin{bmatrix} fx & 0 & cx \\ 0 & fy & cy \\ 0 & 0 & 1 \end{bmatrix}$$

In the above matrix A, a camera view angle is represented by fx and fy. For example, consider a case of a typical camera (pinhole camera model) where an image width is 2000 pixels and a horizontal angle of view is 60 degrees. In this case, "cx=2000/2=1000" and "fx=1/tan(60/2)*(2000/2)=around 1732".

The camera matrix is a matrix necessary to find r11 to r33 and t1 to t3 that minimize an error in equation representing perspective projection transformation shown below in order to solve the PnP problem.

$$s \begin{bmatrix} u \\ v \\ 1 \end{bmatrix} = \begin{bmatrix} f_x & 0 & c_x \\ 0 & f_y & c_y \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} X \\ Y \\ Z \\ 1 \end{bmatrix}$$

where (X,Y,Z) is a point coordinate in the 3D world coordinate system, (u, v) is a projection point coordinate in the 2D normalized image coordinate system, r11 to r33 are elements of a rotation matrix, t1 to t3 are elements of a translation vector, and s is a constant factor.

R11 to r33 and t1 to t3 obtained as a solution of the above equation (equation representing perspective projection transformation), correspond to an orientation of a camera (rotation matrix) and a position of the camera (translation vector).

Distortion coefficient vector is used to obtain an ideal point coordinate with distortion correction from an observed point coordinate. The camera matrix and the distortion coefficient vector can be acquired from camera calibration as indicated in References 1 and 2 below.

[Reference Document 1]
http://labs.eecs.tottori-u.ac.jp/sd/Member/oyamada/OpenCV/html/py_t utorials/py_calib3d/py_calibration/py_calibration.html#calibration

[Reference Document 2]
http://opencv.jp/opencv-2.1/cpp/camera_calibration_and_3d_reconstruc tion.html#cv-calibratecamera

[Outline of Operation of the System]

The following describes an outline of operation of the article position management system with reference to FIG. 2.

The camera apparatuses (mobile camera apparatus 10 and fixed camera apparatus 20) capture images in the field at a predetermined timing or periodically. The image data captured by the camera apparatus is transmitted to the article position management apparatus 30 together with an identifier (ID; Identification) of each camera apparatus.

The article position management apparatus 30 calculates an absolute position of the article 40 (article marker 50) in the field based on the image data received. In doing so, the article position management apparatus 30 changes (switches over) a method for calculating the absolute position of the article 40 according to a source of the image data (mobile camera apparatus 10 or fixed camera apparatus 20). The identification of the source of the image data is based on the identifier of each camera apparatus.

First, a case where the source of the received image data is the mobile camera apparatus 10 will be described. In this case, the article position management apparatus 30 determines whether or not a reference point marker 60 and an article marker 50 appear simultaneously in the image data. More specifically, the article position management apparatus 30 tries to extract the reference point marker 60 and the article marker 50 from the obtained image data.

If the two markers appear in the image data at the same time, the article position management apparatus 30 calculates a position (relative position) of the reference point marker 60 relative to the mobile camera apparatus 10 at a time when the relevant image data (image data on which the two markers appear) is captured based on information about the reference point marker 60.

The article position management apparatus 30 calculates a relative position of the article marker 50 to the mobile camera apparatus 10 at a time when the image data capture is captured based on the information about the article marker 50 included in the image data.

Then, the article position management apparatus 30 calculates an absolute position of the article marker 50 included in the image data based on the relative positions of the two markers calculated above and coordinate information (absolute position and absolute orientation) of the reference point marker 60.

The article position management apparatus 30 manages the position of each article 40 by associating the absolute position of the article marker 50 with the article 40.

Next, a case where the source of the received image data is a fixed camera apparatus 20 is described.

The article position management apparatus 30 determines whether or not an article marker 50 appear on the received image data. If an article marker 50 appears on the image data, the article position management apparatus 30 calculates the relative position of the article marker 50 to the fixed camera apparatus 20.

Since coordinate information (absolute position and absolute orientation) of the fixed camera apparatus 20 is known by the article position management apparatus 30, the article position management apparatus 30 calculates an absolute position of the article marker 50 based on the coordinate information of the fixed camera apparatus 20 and the relative position of the article marker 50.

The article position management apparatus 30 manages the position of each article 40 by associating the absolute position of the article marker 50 with the article 40.

Thus, in a case where a camera apparatus is the mobile camera apparatus 10, the article position management apparatus 30 identifies a position of the article 40, based on the reference point marker 60 whose coordinate information in an absolute coordinate system in a field is set in advance and the article marker 50 attached to the article. In contrast, in a case where a camera apparatus is the fixed camera apparatus 20, the article position management apparatus 30 identifies a position of an article 40 based on the article marker 50 included in the image data. Note that coordinate information of the fixed camera apparatus 20 is also set in advance.

Next, individual apparatuses included in the article position management system will be described.

[Mobile Camera Apparatus]

Figure 4:
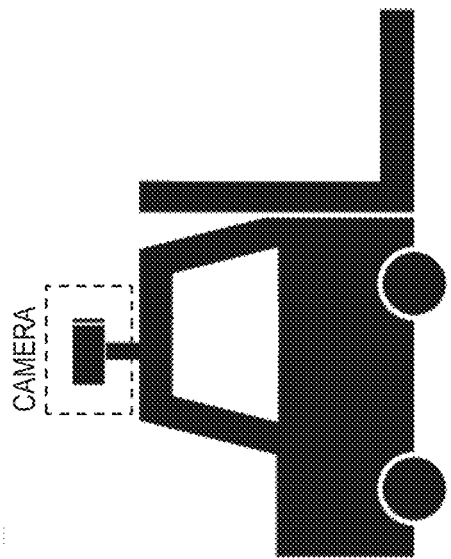
FIG. 4 is a diagram illustrating an example of a mobile camera apparatus according to the first example embodiment.

FIG. 4 is a diagram illustrating an example of the appearance of the mobile camera apparatus 10 of the first example embodiment.

As described above, the mobile camera apparatus 10 is realized by installing a camera on a mobile body such as a forklift truck. The mobile body may be a transport cart or a "person". In the first example embodiment, a case where one mobile camera apparatus 10 is installed on one mobile body will be described. As described above, a motive power (moving system) of the mobile camera apparatus 10 may be any one and thus a detailed description thereof is omitted.

Figure 5:
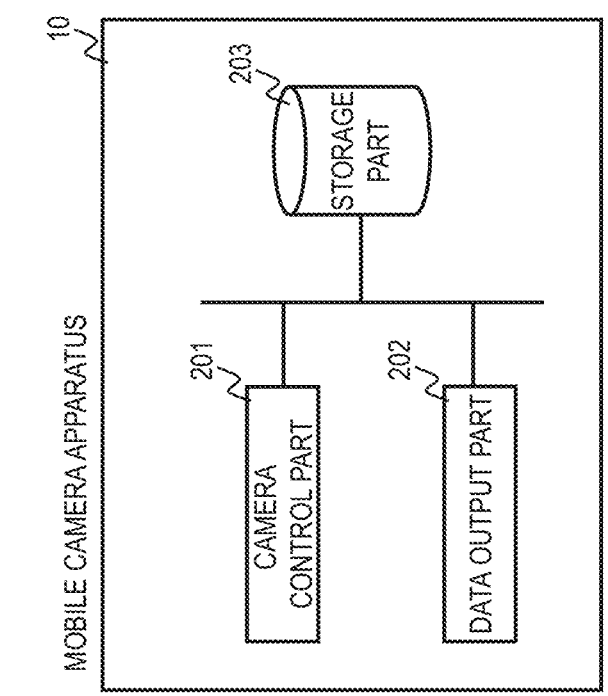
FIG. 5 is a diagram illustrating an example of a processing configuration of the mobile camera apparatus according to a first example embodiment.

FIG. 5 is a diagram illustrating an example of a processing configuration (processing module) of a mobile camera apparatus 10 according to the first example embodiment. Referring to FIG. 5, the mobile camera apparatus 10 includes a camera control part 201, a data output part 202, and a storage part 203.

The camera control part 201 is a means that controls a camera (not shown). The camera control part 201 controls the camera to obtain image data. It is noted that the camera control part 201 may obtain image data at a predetermined interval or at predetermined timing. Alternatively, in cooperation with a control module of a mobile body (e.g., a forklift) or the like, the camera control part 201 may acquire image data when movement of the mobile body meets a predetermined condition. For example, the camera control part 201 may obtain image data when the mobile body comes to a stop. Alternatively, the camera control part 201 may obtain the image data based on instruction from the system administrator, the forklift operator, or the article position management apparatus 30.

The camera control part 201 delivers the obtained image data to a data output part 202. The data output part 202 transmits the image data to the article position management apparatus 30. The data output part 202 may transmit the image data to the article position management apparatus 30 in real time, or may transmit the image data to the article position management apparatus 30 in a batch, after accumulating a predetermined amount of image data.

The storage part 203 is a means that stores information and data necessary for operation of the mobile camera apparatus 10. For example, the storage part 203 stores an identifier assigned to its own apparatus (mobile camera apparatus 10). When transmitting image data to the article position management apparatus 30, the data output part 202 also transmits the above identifier of its own apparatus.

[Fixed Camera Apparatus]

Since a processing configuration (processing module) of the fixed camera apparatus 20 can be same as that of the mobile camera apparatus 10, the description corresponding to FIG. 5 for the fixed camera apparatus 20 is omitted.

[Article Position Management Apparatus]

Figure 6:
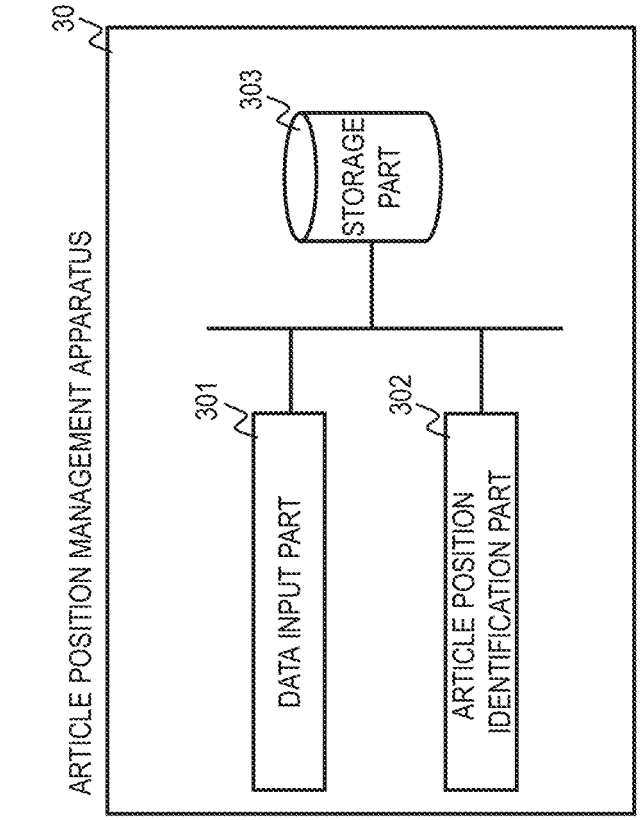
FIG. 6 is a diagram illustrating an example of a processing configuration of an article position management apparatus according to the first example embodiment.

FIG. 6 is a diagram illustrating an example of a processing configuration (processing module) of an article position management apparatus 30 according to the first example embodiment. Referring to FIG. 6, the article position management apparatus 30 includes a data input part 301, an article position identification part 302, and a storage part 303.

The data input part 301 is a means that receives (acquires) image data from a camera apparatus (mobile camera apparatus 10, or fixed camera apparatus 20). The data input part 301 delivers the obtained image data to the article position identification part 302.

The article position identification part 302 identifies a position of an article 40 based on the obtained image data. The operation of the article position identification part 302 is described below.

The storage part 303 stores information and data necessary for operation of the article position management apparatus 30. More specifically, the storage part 303 stores information about a reference point marker 60, information about an article marker 50, information about a camera, and information about a position of an article 40. In the following description, the information about the reference point marker 60 will be referred to as "reference point marker information". The information about the article marker 50 is referred to as "article marker information". The information about a camera is referred to as "camera-related information". The information about position of an article 40 is referred to as "article position information".

FIG. 7 is a diagram illustrating an example of reference point marker information. As shown in FIG. 7, the reference point marker information causes an identifier of the reference point marker, coordinate information (absolute position, absolute orientation) of the reference point marker, and a size of the reference point marker to be mutually associated.

An identifier of the reference point marker 60 is, for example, information that specifies a pattern file (e.g., file name, etc.) of the AR marker, as described above.

An absolute position of the reference point marker 60 is a coordinate with respect to an origin (e.g., an entrance or exit of a field). An absolute orientation of the reference point marker 60 is a rotation matrix that indicates an orientation in which the reference point marker 60 is attached. The direction of the reference point marker 60 may be specified by parameters (roll, pitch and yaw) that can generate a rotation matrix, instead of being specified by the rotation matrix.

A size of the reference point marker 60 is a one side length if a shape of the marker is a square, or vertical and horizontal lengths if it is a rectangle. In FIG. 7, the reference point marker is set to a square and one side length thereof is listed.

FIG. 8 is a diagram illustrating an example of article marker information. As illustrated in FIG. 8, the article marker information is information that corresponds to an identifier of the article to which the article marker is attached, an identifier of the article marker, and a size of the article marker.

The identifier of an article is, for example, a serial number of the article being managed. Alternatively, an article name may be used as the article identifier.

An identifier of an article marker 50 is the same kind of information as an identifier of a reference point marker 60 described above. A size of the article marker 50 is also the same kind of information as a size of the reference point marker 60 described above. Therefore, descriptions regarding these are omitted.

FIG. 9 is a diagram illustrating an example of camera related information. As illustrated in FIG. 9, camera related information is information that causes an identifier of the camera apparatus, a type of each camera apparatus (mobile or fixed), information on an angle of view and distortion of the camera mounted on each camera apparatus, and coordinate information (absolute position and orientation) of the fixed camera apparatus, to be mutually associated.

For example, an IP (Internet Protocol) address or MAC (Media Access Control) address can be used as an identifier of a camera apparatus. If a camera apparatus is a fixed camera apparatus 20, coordinate information (absolute position and absolute orientation) where the camera apparatus is installed is registered as camera related information. As described above, information on an angle of view and a distortion of the camera included in the camera related information is used for detecting relative position of the reference point marker 60 or the like by PnP method. More specifically, information on an angle of view (camera matrix) is used as a parameter to solve the PnP problem in the perspective projection transformation equation. Information about distortion (distortion coefficient vector) is used to obtain ideal point coordinates with distortion correction from observed point coordinates.

FIG. 10 is a diagram illustrating an example of article position information. As illustrated in FIG. 10, the article position information is information that causes the article identifier and the absolute position of the article to be mutually associated. The "absolute orientation" may be added to the article position information. That is, not only the absolute position of the article but also the orientation in which the article is placed may be managed by the article position information.

The following describes an operation of the article position identification part 302.

Figure 11:
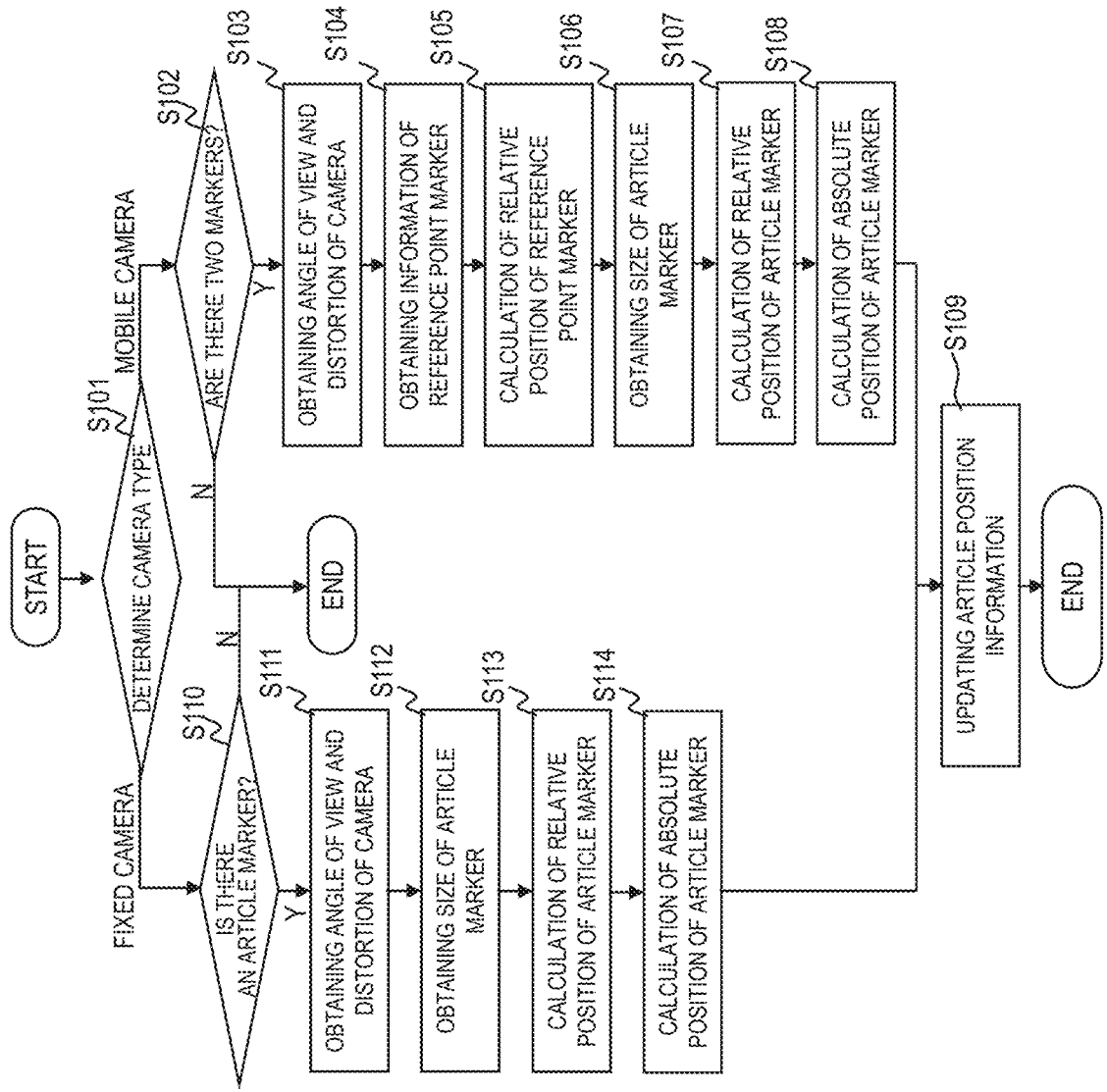
FIG. 11 is a flowchart illustrating an example of an operation of an article position identification part according to the first example embodiment.

FIG. 11 is a flowchart illustrating an example of an operation of the article position identification part 302.

The article position identification part 302 determines, based on an identifier of a camera apparatus assigned to image data, whether a source of the image data is a mobile camera apparatus 10 or a fixed camera apparatus 20 (Step S101). By accessing camera related information, the article position identification part 302 can determine whether the identifier assigned to the image data is an identifier corresponding to the mobile camera apparatus 10 or the fixed camera apparatus 20.

When a source of the image data is the mobile camera apparatus 10, the article position identification part 302 executes processing of step 102 and thereafter.

When the source of the image data is a fixed camera apparatus 20, the article position identification part 302 executes processing of step S110 and thereafter.

In step S102, the article position identification part 302 determines whether or not the image data contains both "reference point marker" and "article marker". More specifically, the article position identification part 302 tries to extract an identifier of a reference point marker 60 and an identifier of an article marker 50 from the image data by the method described above, by referring to the reference point marker information and the article marker information.

If the identifiers of the two markers are extracted, it is determined that the image data contains the reference point marker 60 and the article marker 50. If at least one of the identifiers of the two markers is not extracted, it is determined that the image does not contain the reference point marker 60 and the article marker 50 at the same time.

If the two markers are not in the image at the same time (step S102, No branch), the article position identification part 302 ends the processing.

If the two markers are in the image at the same time (Step S102, Yes branch), the article position identification part 302 refers to the camera related information and obtains information on an angle of view and a distortion of the camera that captured the image data received (Step S103).

The article position identification part 302 refers to the reference point marker information and obtains coordinate information (absolute position, and absolute orientation) and a marker size of the reference point marker 60 corresponding to the identifier of the reference point marker 60 contained in the image data (Step S104).

The article position identification part 302 calculates a relative position of the reference point marker 60 to the mobile camera apparatus 10 at a time when the image data is captured, using the angle of view and the distortion of the camera and the marker size of the reference point marker 60 (Step S105). More specifically, the article position identification part 302 calculates the relative position of the reference point marker 60, using the PnP method.

Next, the article position identification part 302 refers to the article marker information and obtains a size of the article marker 50 corresponding to the identifier of the article marker 50 included in the image data (step S106).

The article position identification part 302 calculates a relative position of the article marker 50 relative to the mobile camera apparatus 10 at a time when image data is captured, using the angle of view and the distortion of the camera and the size of the article marker 50 (marker size) (Step S107). More specifically, the article position identification part 302 calculates the relative position of the article marker 50, using the PnP method.

The article position identification part 302 calculates an absolute position of the article marker 50, by using coordinate information (absolute position and absolute orientation) of the reference point marker 60 acquired from the reference point marker information, the relative position of the reference point marker 60 and the relative position of the article marker 50 (Step S108).

The article position identification part 302 updates article position information, by using the calculated absolute position of the article marker 50 (step S109). In doing so, the article position identification part 302 obtains the identifier of the article 40 associated with the identifier of the article marker 50 included in the image data by referring to the article marker information and identifies the article 40 captured by the mobile camera apparatus 10. The article position identification part 302 updates an absolute position of the article position information corresponding to the identified article 40 (identifier of the article 40) with an absolute position of the article marker 50 calculated above.

Note that, as described above, the article position identification part 302 can also reflect the absolute orientation of the article marker 50 in the article position information.

Figure 12:
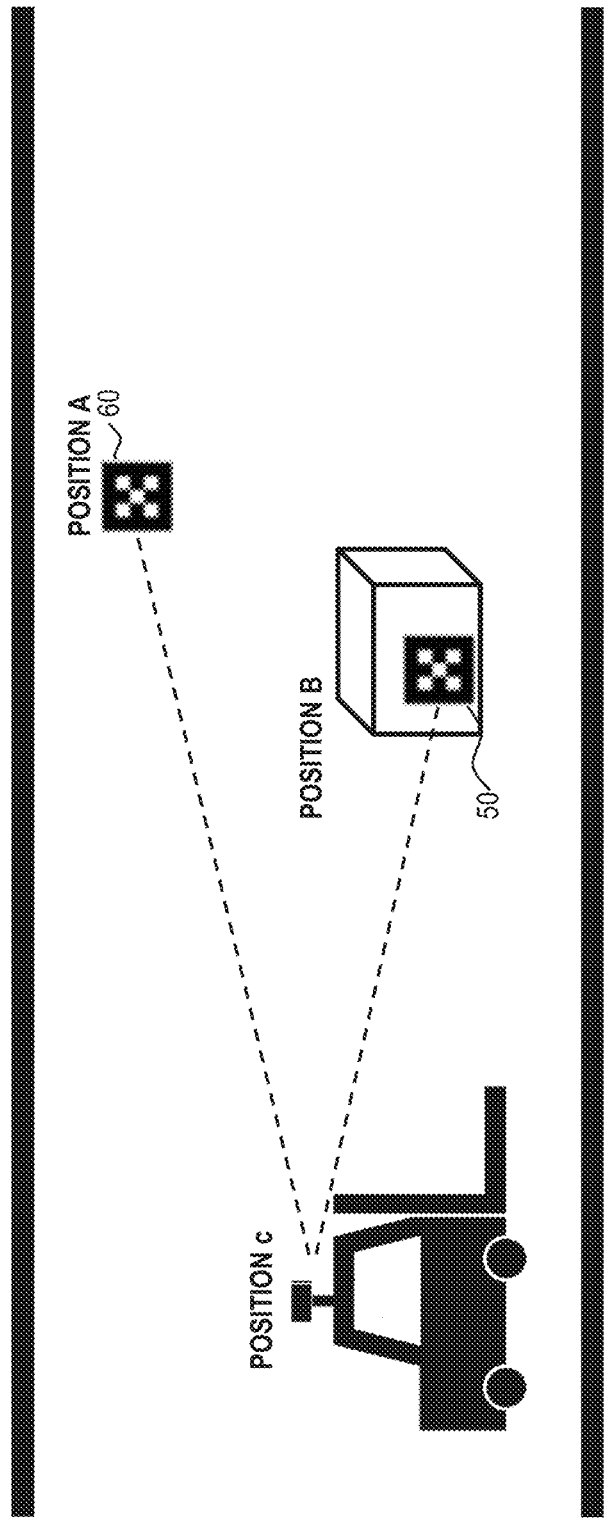
FIG. 12 is a diagram illustrating an operation of the article position management apparatus according to the first example embodiment.

The following describes in detail a method for managing a position of an article when a source of the image data described above is a mobile camera apparatus 10, with reference to FIG. 12.

The mobile camera apparatus 10 simultaneously captures image of a reference point marker 60 and an article marker 50. An article position identification part 302 obtains the image data in which both of the markers are captured simultaneously.

The article position identification part 302 grasps details (coordinate information and marker size) of a camera that captured the image data and a reference point marker 60 and can calculate a relative position cA of the reference point marker 60 relative to a position c of the mobile camera apparatus 10, using PnP method.

Similarly, the article position identification part 302 grasp details of a camera and an article marker 50 that captured the image data and can calculate a relative position cB of the article marker 50 relative to the position c of the mobile camera apparatus 10, using PnP method.

The article position identification part 302 can use the relative positions cA and cB to calculate a relative position cAB of the position B of the article marker 50 to the position A of the reference point marker 60. More specifically, the article position identification part 302 calculates the relative position cAB, using following equation (1).

$$cAB = cB - cA \quad \text{[Equation 1]}$$

Note that cAB in Equation (1) is an orientation vector from the position A of the reference point marker 60 to the position B of the article marker 50.

Next, the article position identification part 302 uses coordinate information (absolute position and absolute orientation) of the reference point marker 60 to obtain an orientation vector from the position A to the position B of the article marker 50 based on the absolute orientation of the reference point marker 60. More specifically, the article position identification part 302 obtains an orientation vector rAB from the position A to the position B based on the absolute orientation of the reference point marker 60, using the following Equation (2).

$$rAB = rAmat * cAB \quad \text{[Equation 2]}$$

where rAmat in Equation (2) is a rotation matrix indicating an absolute orientation of the reference point marker 60.

Next, the article position identification part 302 obtains an absolute position rB of the article marker 50, using the following Equation (3).

$$rB = rA + rAB \quad \text{[Equation 3]}$$

where rA in Equation (3) is an absolute position of the reference point marker 60 (absolute coordinate of position A). When registering the absolute orientation of the article marker 50 in article position information, the article position identification part 302 uses "rAB" in the above Equation (2).

Next, returning to FIG. 11, a case where a source of image data is a fixed camera apparatus 20 is described.

In step S110, the article position identification part 302 judges whether an article marker 50 is included in the image data or not.

If the article marker 50 is not in the image (step S110, No branch), the article position identification part 302 ends processing.

If an article marker 50 is in the image (Step S110, Yes branch), the article position identification part 302 refers to the camera related information and obtains information on an angle of view and a distortion of the camera that captured the image data received (Step S111).

The article position identification part 302 refers to article marker information and obtains a size of the article marker 50 corresponding to an identifier of the article marker 50 included in the image data (Step S112).

The article position identification part 302 calculates a relative position of the article marker 50 relative to the fixed camera apparatus 20, at a time when image data was captured, using the angle of view and the distortion of the above camera and the size of the article marker 50 (marker size) (Step S113).

The article position identification part 302 calculates an absolute position of the article marker 50, using coordinate information (absolute position and absolute orientation) of the fixed camera apparatus 20 and the relative position of the article marker 50 already calculated (Step S114).

The article position identification part 302 updates the article position information, using the calculated absolute position of the article marker 50 (Step S109).

Figure 13:
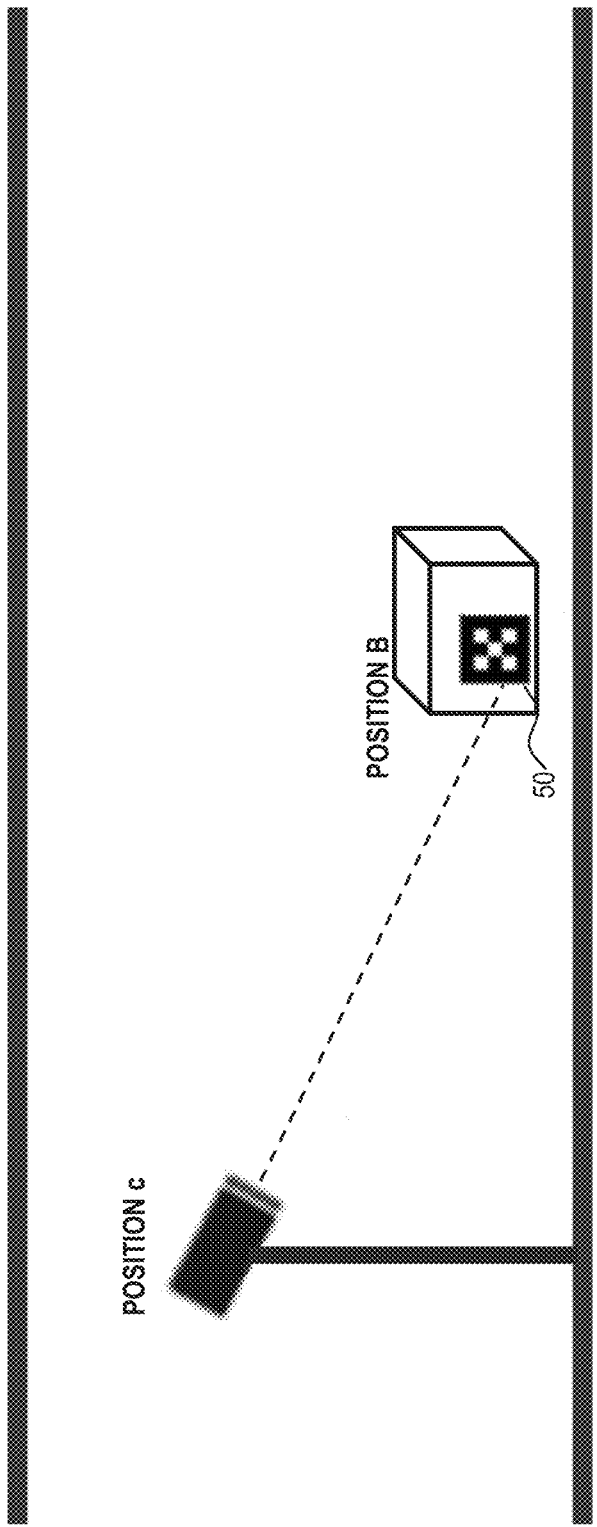
FIG. 13 is a diagram illustrating an operation of the article position management apparatus according to the first example embodiment.

The following describes a method of managing an article position in a case where the source of the image data described above is a fixed camera apparatus 20 in detail with reference to FIG. 13.

A fixed camera apparatus 20 captures an article marker 50. The article position identification part 302 obtains image data in which the article marker 50 is captured.

The article position identification part 302 grasps details of a camera and an article marker 50 that captured the image data and can calculate a relative position cB of the article marker 50 to the position c of the fixed camera apparatus 20, using PnP method.

Next, the article position identification part 302 uses coordinate information (absolute position and absolute orientation) of a fixed camera apparatus 20 to obtain an orientation vector from a position c to a position B of an article marker 50, based on the absolute orientation of the fixed camera apparatus 20. More specifically, the article position identification part 302 obtains an orientation vector rcB from the position c to the position B, based on absolute orientation of the fixed camera apparatus 20, using the following Equation (4).

$$rcB = rCmat * cB \quad \text{[Equation 4]}$$

Note that rCmat in Equation (4) is a rotation matrix that indicates an absolute orientation of the fixed camera apparatus 20.

Next, the article position identification part 302 obtains an absolute position rB of article marker 50, using the following Equation (5).

[Equation 5]

$$rB = rC + rcB \tag{5}$$

In Equation (5), rC is an absolute position of the fixed camera apparatus 20 (absolute coordinate of position c). When an absolute orientation of the article marker 50 is registered in article position information, the article position identification part 302 uses "rCB" in the above Equation (4).

As described above, the article position management apparatus 30 of the first example embodiment switches over a method for calculating an absolute position of the article 40 according to a type of the camera apparatus. More specifically, when the camera apparatus is a mobile camera apparatus 10, the article position management apparatus 30 calculates a relative position of the reference point marker 60 and a relative position of the article marker 50 relative to the mobile camera apparatus 10 at a time when the image data was captured. Then, the article position management apparatus 30 identifies the position of the article, using at least coordinate information of the reference point marker 60, a relative position of the reference point marker 60, and a relative position of the article marker 50. Furthermore, when the camera apparatus is a fixed camera apparatus 20, the article position management apparatus 30 calculates the relative position of the article marker 50 to the fixed camera apparatus 20 at a time when the image data was captured. Then, the article position management apparatus 30 identifies the position of the article, using at least the coordinate information of the fixed camera apparatus and the relative position of the article marker 50.

As a result, the position of the article 40 is accurately managed. In the first example embodiment, a camera moves and shoots every corner in the field. Therefore, a position of the article 40, which cannot be grasped by the fixed camera apparatus 20 due to blind spots, can be accurately grasped. In addition, with the fixed camera apparatus 20 performing pinpoint shooting of an area where the position of the article 40 changes frequently, movement of the article 40, which cannot be instantly grasped with the mobile camera apparatus 10, can be grasped in real time.

In addition, the first example embodiment makes it possible to realize position management of an article 40 at a low cost. Elements necessary for position management of the article 40 described above is mainly a marker (reference point marker 60, article marker 50). Such markers are available in a printed form, and cost for obtaining markers is limited even if the number of articles 40 increases. Therefore, unlike the position management of articles using beacons or the like, position management of the articles 40 can be performed accurately at a low cost.

Second Example Embodiment

A second example embodiment will be described in detail with reference to the drawings.

In the first example embodiment, a case where one camera is installed on one mobile body is described. A second example embodiment describes a case where two or more cameras are installed on one mobile body.

Figure 14:
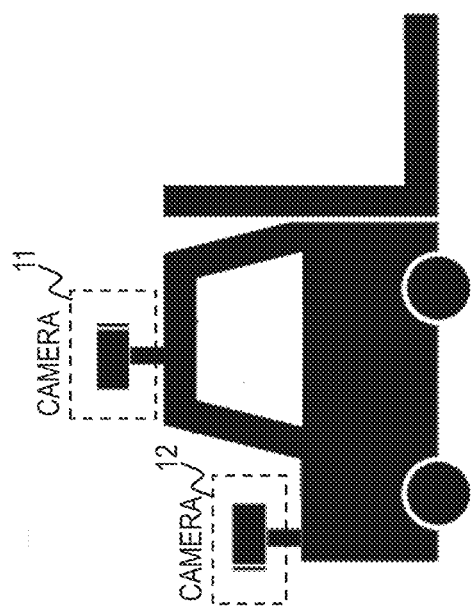
FIG. 14 is a diagram illustrating an appearance of a mobile camera apparatus according to a second example embodiment.

FIG. 14 is a diagram illustrating an appearance of a mobile camera apparatus according to the second example embodiment. As illustrated in FIG. 14, a mobile camera apparatus 10 includes two cameras 11 and 12. Though not limited thereto, it is preferable that the two cameras 11 and 12 are installed in such a way that shooting directions do not overlap.

In addition, positional relationships and camera orientations of the two cameras 11 and 12 installed on the mobile body do not change, and such positional relationships are information that can be known in advance. That is, it is known in advance how far away and at what angle (orientation) the camera 12 is installed with respect to the camera 11.

Note that a system configuration in the second example embodiment can be the same as that in the first example embodiment, so descriptions corresponding to FIG. 2 are omitted. Also, since each processing configuration of the mobile camera apparatus 10, the article position management apparatus 30, and the like can be the same as that of the first example embodiment, descriptions related thereto are omitted.

The following description focuses on differences between the first and second example embodiments.

The second example embodiment differs from the first example embodiment, mainly in an operation in a case where a source of the image data is the mobile camera apparatus 10 in the article position management apparatus 30. More specifically, the operations regarding steps S102 to S108 in FIG. 11 are different.

Figure 15:
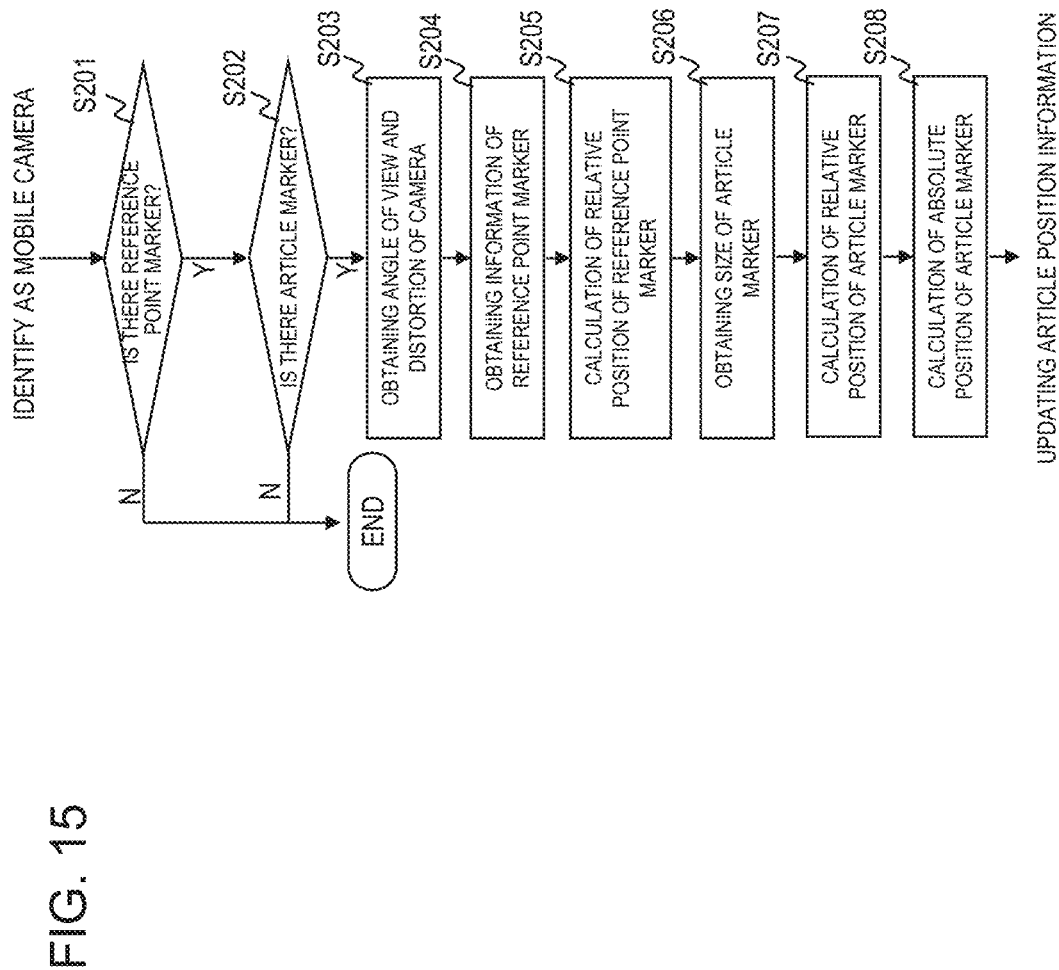
FIG. 15 is a flowchart illustrating an example of an operation of an article position identification part according to the second example embodiment.

FIG. 15 is a flowchart illustrating an example of an operation of an article position identification part 302 according to the second example embodiment. The operation of the second example embodiment of the article position identification part 302 will be described with reference to FIG. 15, which illustrates only processing which differs between the first and second example embodiments out of processing illustrated in FIG. 11.

It is assumed that image data captured by the cameras 11 and 12 are transmitted from the mobile camera apparatus 10 to the article position management apparatus 30 substantially at the same time (difference in transmission time of the image data is less than or equal to a predetermined value). That is, the data input part 301 receives image data from each of at least two or more cameras installed on the same mobile apparatus.

The article position identification part 302 determines whether or not at least one of the two image data includes a reference point marker 60 (Step S201).

If none of the image data includes a reference point marker 60 (step S201, No branch), the article position identification part 302 ends the processing.

If either image data includes a reference point marker 60 (Step S201, Yes branch), the article position identification part 302 determines whether or not the other image data includes an article marker 50 (Step S202).

If the other image data does not include an article marker 50 (step S202, No branch), the article position identification part 302 ends the processing. If the other image data includes an article marker 50 (step S202, Yes branch), the article position identification part 302 performs processing of step S203 and thereafter.

In the following, it is assumed that camera 11, illustrated in FIG. 14, captures a reference point marker 60 and camera 12 captures an article marker 50.

The article position identification part 302 calculates a relative position of the reference point marker 60 relative to the camera 11 at a time when the image data is captured, by using the image data in which the reference point marker 60 appears (steps S203 to S205). The calculation can be the same as the method described in the first example embodiment, so description thereof is omitted.

The article position identification part 302 calculates a relative position of the article marker 50 relative to the camera 12 at a time when the image data is captured, by using the image data in which the article marker 50 appears (steps S206 and S207). The calculation can be the same as the method described in the first example embodiment, so description thereof is omitted.

The article position identification part 302 calculates an absolute position of the article marker 50, by using the relative position of the reference point marker 60, the relative position of the article marker 50, and a difference of position and orientation about the two cameras 11 and 12 (Step S208).

Note that the difference of position regarding two cameras 11 and 12 is a difference in the absolute position between camera 11 and camera 12. The difference of orientation for two cameras 11 and 12 is a difference in the absolute orientation between camera 11 and camera 12. The information about the two cameras (difference in position and orientation) is stored in advance in the storage part 303 of the article position management apparatus 30.

In the first example embodiment, for example, in FIG. 12, relative positions cA and cB are used to calculate a relative position cAB of a position B of the article marker 50 relative to a position A of the reference point marker 60 (see Equation (1)). In the second example embodiment, the information about the two cameras is reflected on the calculation of the relative position cAB.

More specifically, the article position identification part 302 obtains a relative position c2A of the reference point marker 60 when the camera 12 is used as the reference (origin) according to the following Equation (6).

[Equation 6]

$$c2A = c12vec + c12mat * c2B \qquad (6)$$

In Equation (6), c12vec is a vector difference between the absolute positions of the camera 11 and the camera 12. C12mat is a difference in the absolute orientation between the camera 11 and the camera 12 (C12mat is a rotation matrix indicating a difference in the absolute orientation). c2B is a relative position of the article marker 50 with respect to the camera 12.

Since a relative position of the reference point marker 60 with respect to the camera 12 that captured the article marker 50 can be obtained using the above Equation (6), an orientation vector from the position A of the reference point marker 60 to the position B of the article marker 50 can be obtained by replacing "cA" with "c2A" in Equation (1). Once the direction vector is obtained, the article position identification part 302 can calculate coordinate information (absolute position and orientation) of the article marker 50, by using Equations (2) and (3).

Thus, in a case where there are two cameras, there are two coordinate systems which are obtained by PnP method. Therefore, the article position identification part 302 combines the two coordinate systems into one coordinate system and calculates a final position of the article marker 50.

In the above description of the second example embodiment, a case where two cameras are installed on the same mobile body has been described, but it is, as a matter of course, possible to identify a position of an object in the same way even where three or more cameras are installed on the same mobile body. The two or more cameras installed on the same mobile body may have the same specifications or different specifications. When the two or more cameras have different specifications, information on an angle of view and a distortion for each camera may be registered in camera related information.

In the first example embodiment, the reference point marker 60 and the article marker 50 are needed to be included at the same time in a single image, but such image is not needed in the second example embodiment. In the second example embodiment, image in a field is captured by a plurality of cameras and when the reference point marker 60 and the article marker 50 can be captured by the cameras at substantially the same time, the position of the article can be identified. That is, even in a case where it is difficult to capture the reference point marker 60 and the article marker 50 simultaneously with only one camera, the second example embodiment can accurately identify a position of the article 40.

Third Example Embodiment

Next, the third example embodiment will be described in detail with reference to the drawings.

In the third example embodiment, a case is described where a marker (hereinafter referred to as a mobile body marker 70) is attached to a mobile body, and image data in which the mobile body marker 70 captured is used to identify a position of the article marker 50. An AR marker can also be used as the mobile body marker.

Figure 16:
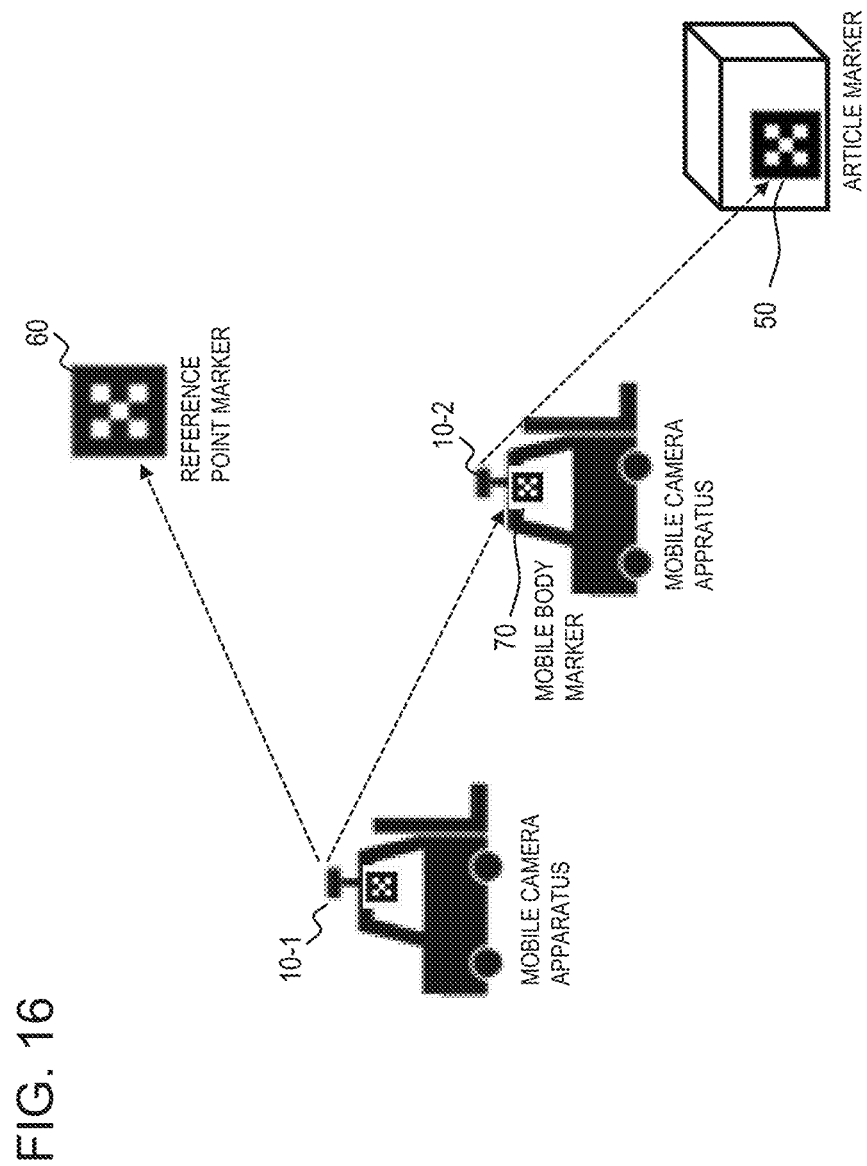
FIG. 16 is a diagram illustrating an operation of an article position management system according to a third example embodiment.

FIG. 16 is a diagram illustrating an operation of the article position management system according to a third example embodiment. As illustrated in FIG. 16, a mobile body marker 70 is attached to each of mobile camera apparatuses 10-1 and 10-2.

In the third example embodiment, a case is described where the mobile camera apparatus 10-1 captures a reference point marker 60 and a mobile body marker 70 simultaneously, and the mobile camera apparatus 10-2 captures an article marker 50 at substantially same timing. In the third example embodiment, each mobile camera apparatus 10 also transmits a capturing (photographing) time of the image data together with the image data to the article position management apparatus 30. In addition, an internal clock (clock) of each mobile camera apparatus 10 is configured so that they can be synchronized with each other, or a clock skew is corrected when the system is operated.

The article position identification part 302 can calculate coordinate information (absolute position and orientation) of the mobile camera apparatus 10-2 from the image data captured by the mobile camera apparatus 10-1 using the same method as described in the first example embodiment.

In addition, since the mobile camera apparatus 10-2 captures the article marker 50, the article position management apparatus 30 can calculate an absolute position of the article marker 50 in the same way as the method of identifying position of the article marker 50 by the fixed camera apparatus 20, described in the first example embodiment.

Note that a system configuration in the third example embodiment can be the same as that in the first example embodiment, so description corresponding to FIG. 2 is omitted. Also, since the processing configuration of the mobile camera apparatus 10, the article position management apparatus 30, and the like can be the same as that of the first example embodiment, description related thereto is omitted.

A storage part 303 of the article position management apparatus 30 stores mobile body marker information in advance. The mobile body marker information is information that associates an identifier of the mobile camera apparatus 10 to which the mobile body marker is attached, an identifier of the mobile body marker, and a marker size each other.

The following description focuses on difference between the first and third example embodiments.

The third example embodiment differs from the first example embodiment mainly in a method for managing a position of an article in the article position identification part 302. More specifically, the operations regarding steps S102 to S108 in FIG. 11 are different.

Figure 17:
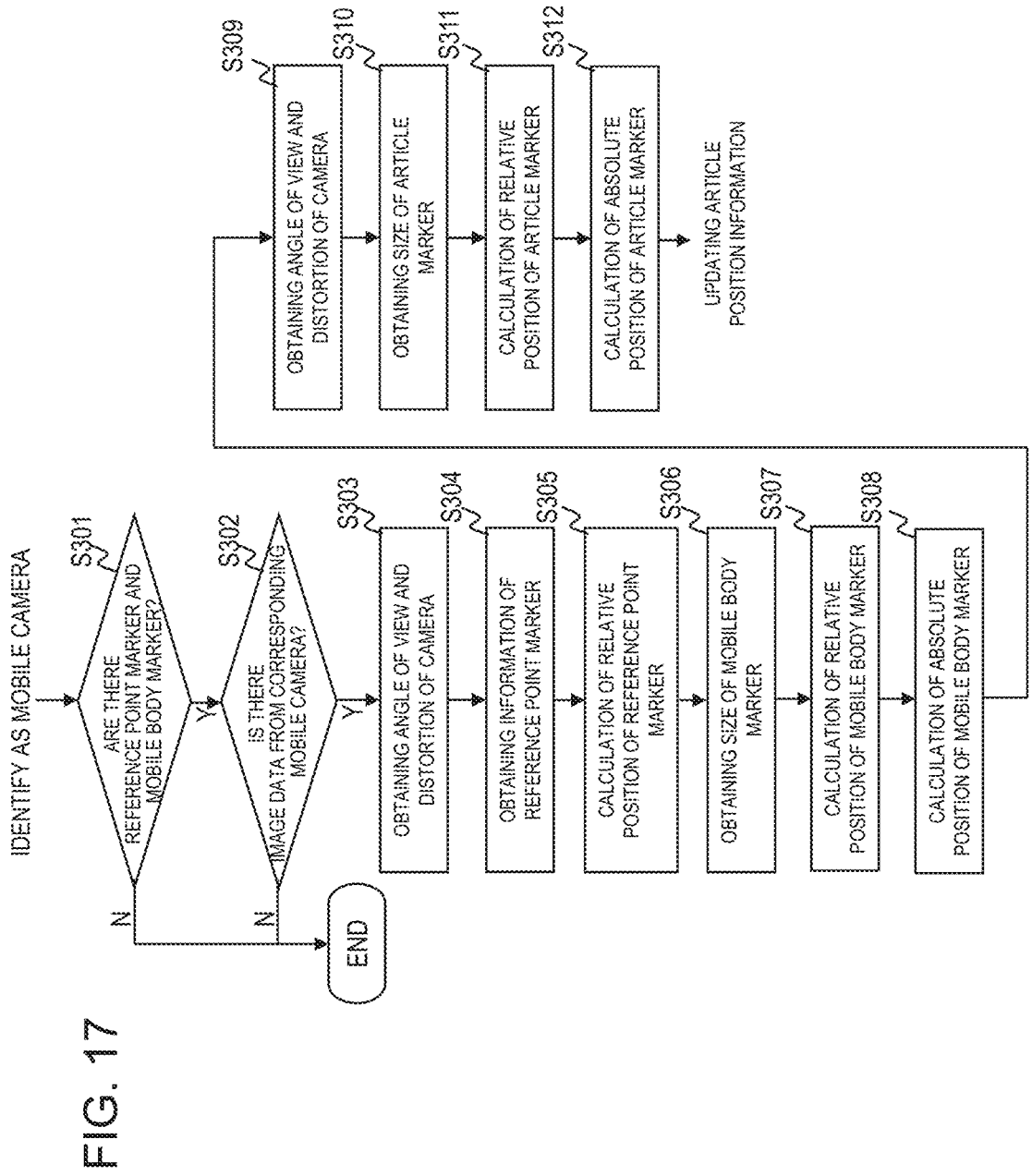
FIG. 17 is a flowchart illustrating an example of an operation of an article position identification part according to the third example embodiment.

FIG. 17 is a flowchart illustrating an example of an operation of the article position identification part according to the third example embodiment. With reference to FIG. 17, the operation of the article position identification part 302 of the third example embodiment will be described. FIG. 17 illustrates only processing that differs between the first and third example embodiments out of the processing illustrated in FIG. 11.

In the third example embodiment, it is assumed that an image data captured by each of the mobile camera apparatuses 10-1 and 10-2 is transmitted to the article position management apparatus 30 substantially at the same time. That is, the article position management apparatus 30 processes, among acquired image data, image data for which difference regarding captured time between two images is less than or equal to a predetermined value.

The article position identification part 302 determines whether or not at least one of the two image data contains the reference point marker 60 and the mobile body marker 70 (Step S301).

If there is no image data that includes the two markers (step S301, No branch), the article position identification part 302 ends the processing.

If image data including the two markers exists (step S301, Yes branch), the article position identification part 302 checks whether the image data has been acquired substantially at the same time from the mobile camera apparatus 10 corresponding to an identifier of the mobile marker 70 (step S302). In the example of FIG. 16, the article position identification part 302 determines whether or not image data has been acquired from the mobile camera apparatus 10-2.

If the above image data is not acquired (step S302, No branch), the article position identification part 302 ends the processing.

If the above image data has been acquired (step S302, Yes branch), the article position identification part 302 executes the processing of step S303 and thereafter.

In steps S303 to S308, the article position identification part 302 calculates the coordinate information (absolute position and absolute orientation) of the mobile body marker 70. For the processing of steps S303 to S308, it is sufficient to replace "article marker" in steps S103 to S108 described in the first example embodiment, with "mobile body marker, and so details are omitted.

Next, the article position identification part 302 performs processing for the image data whose existence has been checked in step S302. More specifically, the article position identification part 302 treats coordinate information (absolute position and absolute orientation) of the mobile camera apparatus 10 in which the mobile body marker 70 is captured, as coordinate information of the fixed camera apparatus 20. That is, the article position identification part 302 calculates an absolute position of the article marker 50, using the same calculation as in steps S111 to S114 described in the first example embodiment (steps S309 to S312).

Thus, the third example embodiment of the article position management apparatus 30 receives a first image data from the mobile camera apparatus 10-1 and a second image data from the mobile camera apparatus 10-2. In addition, a mobile body marker is attached to at least the mobile camera apparatus 10-2. The article position management apparatus 30 identifies a position of the mobile camera apparatus 10-2 based on the reference point marker 60 and the mobile body marker 70 attached to the mobile camera apparatus 10-2, which are included in the first image data. Furthermore, the article position management apparatus 30 identifies a position of the articles 40 based on the article marker 50 and the position of the mobile camera apparatus 10-2 in the second image.

In the third example embodiment, a case is assumed where one camera is installed on one mobile body, but a plurality of cameras may be installed on one mobile body as described in the second example embodiment. That is, the second and third example embodiments may be combined. In addition, although the above describes coordination by two mobile camera apparatuses 10, a position of the article 40 may be identified by coordination of three or more mobile camera apparatuses 10.

As described above, in the third example embodiment, a position of the mobile body marker 70 is identified if the reference point marker 60 and the mobile body marker 70 are captured at the same time, by regarding the mobile body marker 70 of the mobile camera apparatus 10 as an article marker. When the identified mobile camera apparatus 10 captures the article marker 50, a position of the article 40 can be identified by treating the mobile camera apparatus 10 in the same way as the fixed camera apparatus 20. As a result, even if a large field is to be managed, a position of the article 40 in the field can be managed without missing by introducing a large number of mobile camera apparatuses 10 into the system.

Fourth Example Embodiment

Next, a fourth example embodiment will be described in detail with reference to the drawings.

The fourth example embodiment describes a case where an article marker 50 is attached to an article 40 whose position is identified is used as a new reference point marker 60.

Figure 18:
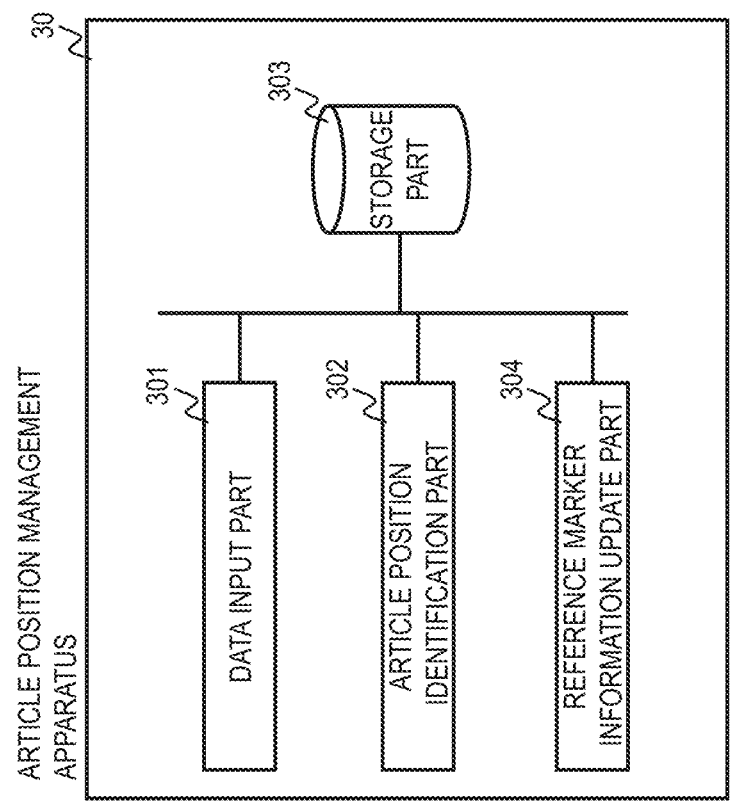
FIG. 18 is a diagram illustrating an example of a processing configuration (operational module) of an article position management apparatus according to a fourth example embodiment.

FIG. 18 is a diagram illustrating an example of a processing configuration (processing module) of an article position management apparatus 30 according to the fourth example embodiment. As illustrated in FIG. 18, in the fourth example embodiment, a reference point marker information update part 304 is added.

After identifying a position of an article 40, the article position identification part 302 notifies coordinate information (absolute position and absolute orientation) of the article 40 to the reference point marker information update part 304. The reference point marker information update part 304 appends the coordinate information of the article 40 to the reference point marker information (see FIG. 7).

Among information to be appended to reference point marker information, the reference point marker information update part 304 obtains coordinate information (absolute position and absolute orientation) from the article position identification part 302 and obtains information on a size from the article marker information.

The article position identification part 302 uses the added article marker 50 as a new reference point marker 60 to identify a position of the article 40.

As described above, in the fourth example embodiment, the article marker 50 with a position thereof identified is used as a new reference point marker 60 to serve to identify position of the article 40. As a result, the number of reference point markers 60 gradually increases with operation of the system, thus increasing opportunities for simultaneous capturing of the reference point markers 60 and the article markers 50. This enables to realize position management of the articles 40 without omission.

Next, a hardware configuration of an article position management apparatus 30 will be described.

[Hardware Configuration]

Figure 19:
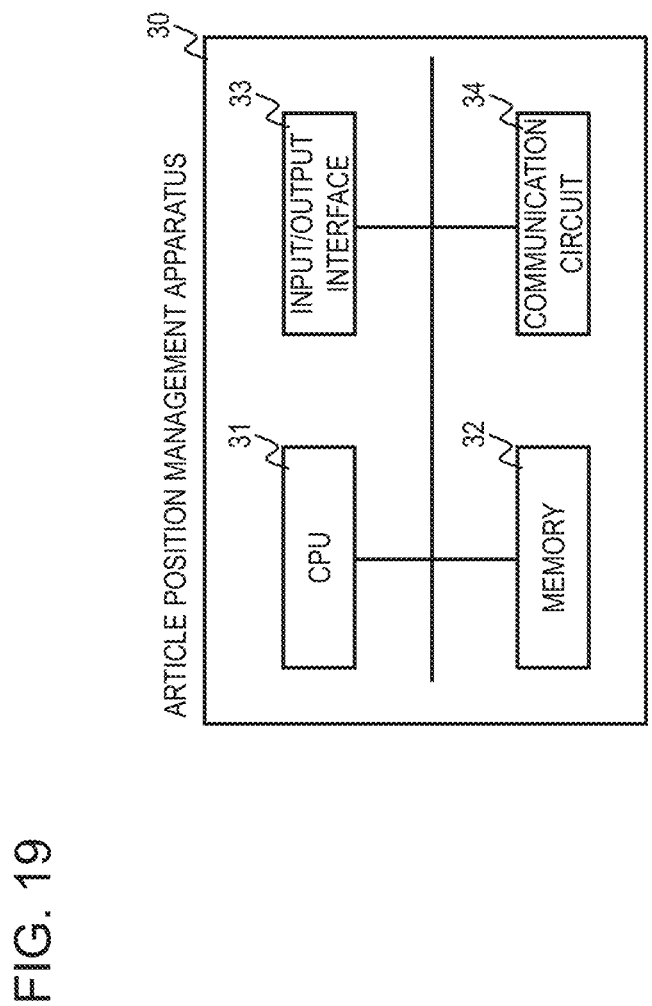
FIG. 19 is a diagram illustrating an example of a hardware configuration of the article position management apparatus.

FIG. 19 is a diagram illustrating an example of a hardware configuration of the article position management apparatus 30. The article position management apparatus 30 has a configuration illustrated in FIG. 19. For example, the article position management apparatus 30 is implemented with a central processing unit (CPU) 31, a memory 32, an input/output interface 33, a communication circuit 34 as a communication means, and the like, which are interconnected by an internal bus.

It is noted that the configuration illustrated in FIG. 19 is not intended to limit the hardware configuration of the article position management apparatus 30. The article position management apparatus 30 may include hardware not illustrated in the figure. The number of CPUs, etc. included in the article position management apparatus 30 is also not intended to be limited to the example illustrated in FIG. 19; for example, a plurality of CPUs 31 may be included in the article position management apparatus 30.

The memory 32 may include RAM (Random Access Memory), ROM (Read Only Memory), auxiliary storage (hard disk, etc.), etc.

The input/output interface 33 is an interface for an input/output apparatus(es) not illustrated in the figure. The input/output apparatus(es) may include, for example, a display apparatus, operation apparatus, or the like. The display apparatus is, for example, a liquid crystal display. The operation apparatus is, for example, a keyboard, mouse, etc.

The functions of the article position management apparatus 30 are realized by the processing module described above. The processing module is realized, for example, by the CPU 31 executing a program stored in the memory 32. In addition, the program can be downloaded via a network or updated using a storage medium that stores the program. Furthermore, the above processing module may be realized by a semiconductor chip. That is, the functions performed by the above processing module can be realized by some hardware or software that is executed using the hardware.

[Variations]

The configuration and operation of the article position management system described in each of the first through fourth example embodiments are just examples and are not intended to limit the configuration of a system.

Figure 20:
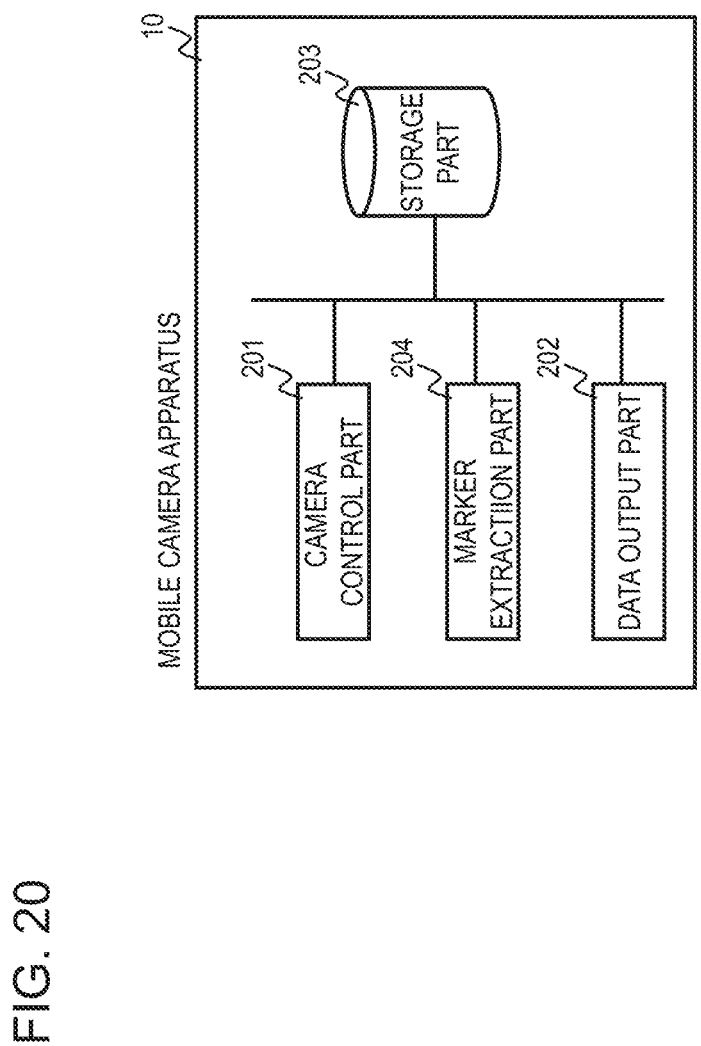
FIG. 20 is a diagram illustrating an example of another processing configuration of a mobile camera apparatus.
Figure 21:
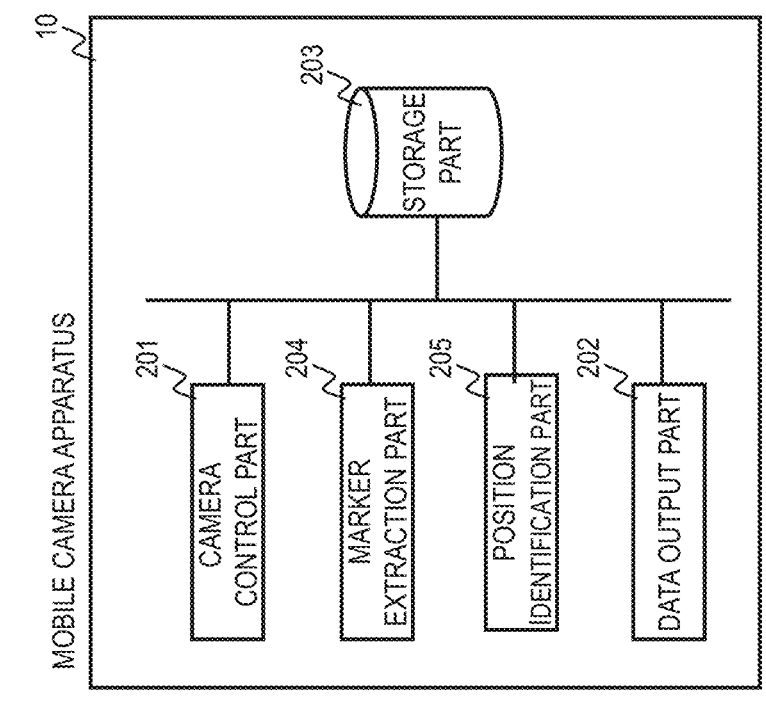
FIG. 21 is a diagram illustrating an example of another processing configuration of a mobile camera apparatus.

For example, among a plurality of functions of the article position management apparatus 30, some may be implemented in a camera apparatus. More specifically, the functions of the article position identification part 302 of the article position management apparatus 30 can be separated into a module for extracting an AR marker from image data (marker extraction part) and a module for identifying article positions (position identification part). The camera apparatus may be provided with some or all of these functions to realize load distribution of the article position management apparatus 30. For example, when the marker extractor is implemented in the mobile camera apparatus 10 (see FIG. 20), the mobile camera apparatus 10 can notify the image data from which a marker is extracted and a type of marker extracted (reference point marker 60, or article marker 50) to the article position management apparatus 30. Alternatively, when the marker extraction part and the article position identification part are implemented in the mobile camera apparatus 10 (see FIG. 21), the position of the article 40 identified from the mobile camera apparatus 10 may be notified to the article position management apparatus 30. That is, the camera apparatus may transmit a position of the article 40 identified from the image data to the article position management apparatus 30 instead of the image data. Thus, assignment of roles of each function (acquisition of image data, marker extraction, and identification of an article position) described in the above example embodiment is an example. Therefore, in the article position management system, it suffices for the camera apparatus and the article position management apparatus 30 to include means for generating image data, for extracting a marker, and for identifying a position of the article 40. The means for generating image data (camera control part 201) captures a reference point marker 60 whose coordinate information in the absolute coordinate system in the field is set in advance and an article marker 50 attached to the article and generates image data. The means for extracting a marker (marker extraction part 204) extracts the reference point marker 60 and the article marker 50 from the image data. The means for identifying a position of the article 40 (article position identification part 302) identifies a position of the article 40 based on the reference point marker 60 and the article marker 50 when the image data is generated by the mobile camera apparatus 10. Alternatively, the means for identifying a position of the article 40 identifies a position of the article 40, based on the article marker 50 when the image data is generated by the fixed camera apparatus 20.

In the above example embodiment, a case is described where one article position management apparatus 30 is included in a system, but a plurality of article position management apparatuses 30 may be included in the system. In this case, the load on the article position management apparatus 30 can be distributed by predetermining the article position management apparatus 30 to be a destination of the image data from each camera apparatus, even when a scale of the system expands.

In the above example embodiment, image data is sent directly from the camera apparatus to the article position management apparatus 30, but the image data may be sent to the article position management apparatus 30 via an image data collection server. In this case, the image data collection server may filter the image data (e.g., discarding image that do not include a marker) to reduce a load on the article position management apparatus 30.

The article position management apparatus 30 may cache a calculated position of the article 40 for a predetermined period of time and omit calculation of a position for an article 40 hitting the cache. For example, if it is known in advance that an article will not be moved, such as on a day when a factory is not in operation, it is not necessary to recalculate a position of the article 40 with a position thereof already calculated. By using a cache, such unnecessary recalculation can be omitted.

The above example embodiment describes a case where one reference point marker 60 or an article marker 50 is captured in one image, but there may be cases where a plurality of markers of the same type are captured in one image data. In this case, the article position management apparatus 30 may use the marker that is closest to the camera apparatus for calculating a position of an article, or it may use the marker with the highest recognition accuracy (similarity with a pattern file) for calculating a position of the marker. Alternatively, when a plurality of markers of the same type are included in one image data, the article position management apparatus 30 may calculate a relative position, etc., from each marker and use an average of these values as a final value. Such a measure can improve an accuracy of position calculation.

In the above example embodiment, a type of camera apparatus is determined by an identifier of a camera apparatus transmitted with image data, but a type of a camera apparatus may be determined by comparing image data. For example, the article position management apparatus 30 may store image data in association with an IP address of a sender of the image data, and when difference between image data previously received and a latest image data is small, the sender of the image data may be determined to be a "fixed camera apparatus," while if it is large, the sender of the image data may be determined to be a "mobile camera apparatus.

In the above example embodiment, a case is described where a still image is sent from the camera apparatus to the article position management apparatus 30 is described, but a moving image may be sent to the article position management apparatus 30. In this case, the article position management apparatus 30 may extract a frame at a predetermined rate from the moving image and treat the frame extracted as image data as described above.

In the above example embodiment, it is assumed that one marker (article marker 50, mobile body marker 70) is attached to one article 40 or mobile body, but a plurality of markers may be attached to the article 40 or mobile body. In that case, the identifiers of the markers to be attached may be the same, as long as a purpose is to identify an article 40, etc. When a plurality of markers with different identifiers are attached to the same article 40, etc., each correspondence of each of the identifiers with the article 40 may have to be managed (recorded).

In the above example embodiment, a case is described where the camera installed in the mobile camera apparatus 10 has its orientation fixed has been described, but the camera may be configured to have a variable orientation. More specifically, the orientation of the camera may be changed by connecting the camera to an actuator including a motor or the like. In this case, one camera may be treated in the same way as "two cameras installed on the same mobile body" as described in the second example embodiment. In this case, the difference in absolute orientations between the two cameras (before and after a change of orientation) in Equation (6) cannot be known in advance. Therefore, the above absolute orientation difference may be calculated from a control value of the actuator and used as the absolute orientation difference in Equation (6). Alternatively, a gyro sensor or the like may be attached to a camera and an amount of rotation may be acquired from the sensor to calculate a difference in the absolute orientation. That is, the orientation of the camera installed in the mobile camera apparatus 10 is configured to be variable. In this case, the mobile camera apparatus 10 transmits first image data captured in a first orientation, second image data captured in a second orientation, and a difference (amount of rotation) between the first and second orientations, with respect to the camera with the orientation variably configured, to the article position management apparatus 30. Next, the article position identification part 302 of the article position management apparatus 30 calculates, based on the reference point marker 60 included in the first image data, a relative position of the reference point marker 60 to the mobile camera apparatus 10 at a time when the first image data is captured. Further, the article position identification part 302 calculates a relative position of the article marker 50 to the mobile camera apparatus 10 at a time when the second image data is captured, based on the article marker 50 included in the second image data. Next, the article position identification part 302 identifies a position of the article 40 using the relative position of the reference point marker 60, the relative position of the article marker 50, and the difference (amount of rotation) between the first and second orientations of the camera.

Zooming (changing an angle of view) may be adopted to control a camera. For example, when the camera control part 201 of a camera apparatus confirms that a reference point marker 60 is captured, image data in which the reference point marker 60 is included is saved. Furthermore, the camera control unit 201 zooms in and captures the image data. At that time, if an article marker 50 is captured, the camera control part 201 also saves the image data. Two pieces of saved image data are then transmitted to the article position management apparatus 30. The article position management apparatus 30 may process the two pieces of image data in the same way as described in the second example embodiment to identify a position of the article 40. When a relative position of the article marker 50 is calculated from the zoomed image data, a zoom value is required. In this case, the zoom value may be a value determined in advance between the camera apparatus and the article position management apparatus 30, or a value instructed by the article position management apparatus 30. Or the camera apparatus may notify the zoom value used together with the image data to the article position management apparatus 30. The zoom value required for processing image data is a value of a focal length, an angle of view, etc. That is, the camera installed in the mobile camera apparatus 10 is configured to have a variable focal length. The mobile camera apparatus 10 captures the first image data and the second image data with the focal length changed and transmits the first and second image data to the article position management apparatus 30. The article position identification part 302 of the article position management apparatus 30 calculates a relative position of the reference point marker 60 relative to the mobile camera apparatus 10 at a time when the first image data is captured, based on the reference point marker 60 included in the first image data captured by the camera with the first focal length. Further, the article position identification part 302 calculates a relative position of the article marker 50 relative to the mobile camera apparatus 10 at a time when the second image data is captured, based on the article marker 50 included in the second image data captured by the camera with the second focal length. Thereafter, the article position identification part 302 identifies a position of the article 40 using the relative position of the reference point marker 60 and the relative position of the article marker 50. Since a focal length and an angle of view are mutually convertible information by tangent calculation, it suffices that either one of a focal length or an angle of view can be obtained as a zoom value.

In the above example embodiment, the description is based on assumption that the reference point marker 60 and the article marker 50 are the same markers (AR markers), but these may be different markers. In such a case, an appropriate method of detection may be applied to each marker.

In the above example embodiments, estimation of a position of article mainly based on an AR marker and a PnP method has been described. However, other marker(s) and other method(s) may be used to estimate a position of an article. For example, article position may be estimated using a high precision AR marker described in Reference Document 3 below. The high precision AR marker disclosed in Reference Document 3 has a two dimensional moiré pattern that changes depending on an angle at which the marker is viewed. Since a pattern of the high precision AR marker changes depending on an angle at which the marker is viewed, a method of estimating a position of an article that is adapted to (takes into account) a change of a pattern of the marker is necessary. More specifically, it is possible to estimate a position of an article using a high precision AR marker by modifying a solution (posture estimate) obtained by the PnP method.

[Reference Document 3]
https://5da3fa2e-a-62cb3a1a-s-sites.googlegroups.com/site/htver2/rese arch/service_robots/newarmarker/Array-Mark_2012. pdf?attachauth=AN oY7cqDnMqRdnkBszHS0j4FFXPVZv4nWNvQo5Wu3 mW6dI5aB0gkZWz OLXCNPstRd_6Dza69LO_mmBlKYqkHtl_bL0M6j1Z4 8ZVfVo2IP8IWth D9MqfM9T20ZQJvAcuAE3bIqvxWks0cdSORjOzIg MmYxfUusYNwd_2o Wp6tF8x4pHA1bEvc9B8ji09LM1XY1DRiLsiGrpM EiBBAFEuobNesI2k zNGO-1jNzzsU3g-IZFOzO-sWdGGKxSMEXzK-ocjIkOQnreZfaYk8Jpti-7S mxMw2nzrH7XA %3D %3D&attredirects=0

A reference point marker or the like may be a marker for which only a coordinate of center can be obtained, for example, a barcode that serves as an identifier. In this case, since coordinates for three or more feature points cannot be obtained, PnP method cannot be used and a relative position, etc. cannot be calculated. Therefore, a marker such as a barcode can be used to calculate its position (image coordinates of center). More specifically, a barcode is used to calculate an orientation from a camera apparatus to an article to which the barcode is attached. Then, a distance between the camera apparatus and the marker (article, etc.) may be measured. More specifically, a laser rangefinder or RGB-D (Red Green Blue-Depth) camera can be used to measure the distance. If there is a special circumstance such as a size of a marker being small, a detectable distance of the marker may be naturally determined and the detectable distance (e.g., 1m) can be adopted as the above distance.

In the second example embodiment described above, a case is described where two or more camera apparatuses are installed on a single mobile body. However, even when a single camera apparatus is installed on a mobile body, the same result as that of the second example embodiment can be obtained if a movement history (movement distance and movement direction) of the mobile body can be grasped. More specifically, if the reference point marker 60 is captured in the image data, a relative position of the mobile camera apparatus 10 relative to the reference point marker 60 is calculated, and the mobile camera apparatus 10 moves. At that time, the mobile camera apparatus 10 generates a movement history (or movement distance and movement direction). If image data including the article marker 50 is obtained during movement, a relative position of the mobile camera apparatus 10 to the article marker 50 can be calculated. Then, a relative position to the reference point marker 60 may be corrected using the movement history, and the position of the article 40 may be identified. A gyro sensor or other apparatus can be used to generate the above movement history.

Alternatively, one camera may be treated as if it were two cameras by the following method. The camera of the mobile camera apparatus 10, at a time when detecting the reference point marker 60 is designated as "c1", for convenience. C1A is a relative coordinate of the reference point marker 60 at that time. For convenience, it is assumed that a camera of the mobile camera apparatus 10 at a time when the article marker 50 is detected is "c2", and c2B is a relative coordinate of the article marker 50 at that time. Then, c12vec (difference in absolute position between camera 1 and camera 2) and c12mat (difference in absolute orientation between camera 1 and camera 2) in the above Equation (6) may be acquired from the movement history. That is, the mobile camera apparatus 10 outputs the first image data in which the reference point marker 60 is captured, the second image data in which the article marker 50 is captured, and the movement history from a time of obtaining the first image data to a time of obtaining the second image data to the article position management apparatus 30. The article position identification part 302 of the article position management apparatus 30 calculates a relative position of the reference point marker 60 relative to the mobile camera apparatus 10 at the time of obtaining the first image data based on the reference point marker 60 included in the first image data. Similarly, the article position identification part 302 calculates a relative position of the article marker 50 relative to the mobile camera apparatus 10 at the time of obtaining the second image data based on the article marker 50 included in the second image data. After then, the article position identification part 302 identifies a position of the article 40 using the relative position of the reference point marker 60, the relative position of the article marker 50, and the movement history of the mobile camera apparatus 10 from a time when the first image data is captured to a time when the second image data is captured.

By installing the above described computer program in a memory of a computer, the computer can be made to function as an article position management apparatus. By having the computer execute the above described computer program, the computer can execute an article position management method.

In a plurality of flowcharts used in the above description, a plurality of processes (processing) are described in order, but an order of execution of the processes performed in each example embodiment is not limited to the order described. In each embodiment, an order of processes illustrated may be changed as long as there is no problem in view of contents, for example, by executing each process in parallel or the like. In addition, each of the abovementioned embodiments can be combined as long as contents do not conflict.

The disclosures in the above-cited patent literatures are incorporated herein by reference and may be used as a basis of the present invention or as part of it, if necessary. Within a framework of the entire disclosure of the invention (including the claims), and based on a basic technical concept, embodiments and examples can be modified and adjusted. In addition, various combination or selection (including partial deletion) of various disclosed elements (including each element of each claim, each element of each embodiment or example, each element of each drawing, etc.) are possible within the framework of the entire disclosure of the present invention. In other words, the present invention, as a matter of course, includes various variations and modifications that a person skilled in the art would be able to make in accordance with the entire disclosure including the scope of claims and the technical concept. In particular, a numerical range described in the present application should be interpreted as specifically describing any numerical value or sub-range included within that range, even if not otherwise stated. In addition, each of the disclosures in the above-cited literatures may be used, if necessary, as part of the disclosure of the present invention in accordance with the gist of the present invention, in part or in whole, in combination with the described matter in the present application, which shall be deemed to be included in the disclosure of the present application.

The invention claimed is:

1. An article position management apparatus, comprising:
a processor;
a memory storing program instructions executable by the processor; and
a receiver that receives image data from a camera apparatus,
wherein the processor is configured to:
identify a position of an article, based on an article marker attached to the article and a reference point marker whose coordinate information in an absolute coordinate system in a field is set in advance, the article marker and the reference point marker being included in the image data, when the camera apparatus is a mobile camera apparatus;
identify the position of the article, based on the article marker included in the image data, when the camera apparatus is a fixed camera apparatus; and
determine whether a sender of the image data is the mobile camera apparatus or the fixed camera apparatus, based on an identifier of the camera apparatus assigned to the image data.

2. The article position management apparatus according to claim 1, wherein the processor is configured to:
when the camera apparatus is the mobile camera apparatus, calculate a relative position of the reference point marker to the mobile camera apparatus at a time when the image data is captured, and a relative position of the article marker to the mobile camera apparatus at the time when the image data is captured; and
identify the position of the article using at least coordinate information of the reference point marker, the relative position of the reference point marker and the relative position of the article marker.

3. The article position management apparatus according to claim 2, wherein the receiver receives first image data and second image data from the mobile camera apparatus, and wherein the processor is configured to:
calculate the relative position of the reference point marker to the mobile camera apparatus at a time when the first image data is captured, based on the reference point marker included in the first image data;
calculate the relative position of the article marker to the mobile camera apparatus at a time when the second image data is captured, based on the article marker included in the second image data; and
identify the position of the article using the relative position of the reference point marker, the relative position of the article marker and movement history of the mobile camera apparatus from a time when the first image data is captured to a time when the second image data is captured.

4. The article position management apparatus according to claim 2, wherein a focal length of a camera installed in the mobile camera apparatus is configured to be variable,
wherein the receiver receives first and second image data from the mobile camera apparatus whose focal length of the camera is configured to be variable,
wherein the processor is configured to:
calculate the relative position of the reference point marker to the mobile camera apparatus at a time when the first image data is captured, based on the reference point marker included in the first image data captured by the camera with a first focal length,
calculate the relative position of the article marker to the mobile camera apparatus at a time the second image data is captured, based on the article marker included in the second image data captured by the camera with a second focal length, and
identify the position of the article using the relative position of the reference point marker and the relative position of the article marker.

5. The article position management apparatus according to claim 2, wherein the mobile camera apparatus is configured to measure at least a distance between the article marker and the mobile camera apparatus, and
wherein the processor is configured to calculate a relative position of the article marker, based on the measured distance.

6. The article position management apparatus according to claim 1, wherein the processor is configured to:
when the camera apparatus is the fixed camera apparatus, calculate a relative position of the article marker to the fixed camera apparatus at a time when the image data is captured; and
identify the position of the article using at least coordinate information of the fixed camera apparatus and the relative position of the article marker.

7. The article position management apparatus according to claim 1, wherein the receiver receives image data from each of at least a first camera apparatus and a second camera apparatus that are the mobile camera apparatus; and
wherein the processor is configured to:
calculate a relative position of the reference point marker to the first camera apparatus at a time when first image data is captured, based on the reference point marker included in the first image data captured by the first camera apparatus, and a relative position of the article marker to the second camera apparatus at a time when second image data is captured, based on the article marker included in the second image data captured by the second camera apparatus; and
identify the position of the article using the relative position of the reference point marker, the relative position of the article marker and position and/or orientation differences with respect to the first camera apparatus and the second camera apparatus.

8. The article position management apparatus according to claim 1, wherein the receiver receives first image data and second image data from a first mobile camera apparatus and a second mobile camera apparatus, respectively,
wherein at least the second mobile camera apparatus is attached with a mobile body marker, and
wherein the processor is configured to:
identify a position of the second mobile camera apparatus, based on the reference point marker and the mobile body marker attached to the second mobile camera apparatus included in the first image data; and
identify the position of the article, based on the article marker included in the second image data and the position of the second mobile camera apparatus.

9. The article position management apparatus according to claim 1, wherein the processor is configured to use the article marker attached to the article with a position thereof being identified as a new reference point marker.

10. The article position management apparatus according to claim 1, wherein each relative position of the reference point marker and the article marker is calculated as a solution of PnP (Perspective-n-Point) problem or by a modification of a solution of PnP problem.

11. The article position management apparatus according to claim 1, wherein the reference point marker and/or the article marker are/is an AR (Augmented Reality) marker(s).

12. An article position management system, comprising:
a reference point marker whose coordinate information in an absolute coordinate system in a field;
an article with an article marker attached thereto;
one or more camera apparatuses that shoot the reference point and/or the article marker attached to the article to generate image data, each camera apparatus being a mobile camera apparatus or a fixed camera apparatus; and
an article position management apparatus including
a processor; and
a memory storing program instructions executable by the processor, wherein the processor is configured to:
extract the reference point marker and the article marker from the image data received from the one or more camera apparatuses;
identify a position of the article, based on the reference point marker and the article marker, when the image data is generated by the mobile camera apparatus;
identify the position of the article, based on the article marker when the image data is generated by the fixed camera apparatus; and
determine whether a sender of the image data is the mobile camera apparatus or the fixed camera apparatus, based on an identifier of the one or more camera apparatuses assigned to the image data.

13. The article position management system according to claim 12, wherein the processor is configured to:
when the one or more camera apparatuses is the mobile camera apparatus, calculate a relative position of the reference point marker to the mobile camera apparatus at a time when the image data is captured, and a relative position of the article marker to the mobile camera apparatus at the time when the image data is captured; and
identify the position of the article using at least the coordinate information of the reference point marker, the relative position of the reference point marker and the relative position of the article marker.

14. The article position management system according to claim 12, wherein the processor is configured to:
when the one or more camera apparatuses is the fixed camera apparatus,
calculate a relative position of the article marker to the fixed camera apparatus at a time when the image data is captured; and
identify the position of the article using at least coordinate information of the fixed camera apparatus and the relative position of the article marker.

15. The article position management system according to claim 12, wherein the processor is configured to:
receive image data from each of at least a first camera apparatus and a second camera apparatus that are the mobile camera apparatus;
calculate a relative position of the reference point marker to the first camera apparatus at a time when first image data is captured, based on the reference point marker included in the first image data captured by the first camera apparatus, and a relative position of the article marker to the second camera apparatus at a time when second image data is captured, based on the article marker included in the second image data captured by the second camera apparatus; and
identify the position of the article using the relative position of the reference point marker, the relative position of the article marker and position and/or orientation differences with respect to the first camera apparatus and the second camera apparatus.

16. The article position management system according to claim 12, wherein the processor is configured to:
receive first image data and second image data from a first mobile camera apparatus and a second mobile camera apparatus, respectively, wherein at least the second mobile camera apparatus is attached with a mobile body marker;
identify a position of the second mobile camera apparatus, based on the reference point marker and the mobile body marker attached to the second mobile camera apparatus included in the first image data; and
identify the position of the article, based on the article marker included in the second image data and the position of the second mobile camera apparatus.

17. An article position management method for an article position management apparatus, the method comprising:
receiving image data from a camera apparatus;
determining whether a sender of the image data is a mobile camera apparatus or a fixed camera apparatus, based on an identifier of the camera apparatus assigned to the image data;
identifying a position of an article, based on an article marker attached to an article and a reference point marker whose coordinate information in an absolute coordinate system in a field is set in advance, the article marker and the reference point marker being included in the image data, when the camera apparatus is the mobile camera apparatus; and
identifying the position of the article, based on the article marker included in the image, when the camera apparatus is the fixed camera apparatus.

18. A non-transitory computer-readable medium storing a program causing a computer installed on an article position management apparatus to perform processing comprising:
receiving image data from a camera apparatus;
determining whether a sender of the image data is a mobile camera apparatus or a fixed camera apparatus, based on an identifier of the camera apparatus assigned to the image data;
identifying a position of an article, based on an article marker attached to an article and a reference point marker whose coordinate information in an absolute coordinate system in a field is set in advance, the article marker and the reference point marker being included in the image data, when the camera apparatus is the mobile camera apparatus; and
identifying the position of the article, based on the article marker included in the image, when the camera apparatus is the fixed camera apparatus.

19. An article position management apparatus, comprising:
a processor;
a memory storing program instructions executable by the processor; and
a receiver that receives image data from a camera apparatus,
wherein the processor is configured to:
identify a position of an article, based on an article marker attached to the article and a reference point marker whose coordinate information in an absolute coordinate system in a field is set in advance, the article marker and the reference point marker being included in the image data, when the camera apparatus is a mobile camera apparatus; and identify the position of the article, based on the article marker included in the image data, when the camera apparatus is a fixed camera apparatus, when the camera apparatus is the mobile camera apparatus, calculate a relative position of the reference point marker to the mobile camera apparatus at a time when the image data is captured, and a relative position of the article marker to the mobile camera apparatus at the time when the image data is captured; and identify the position of the article using at least coordinate information of the reference point marker, the relative position of the reference point marker and the relative position of the article marker, wherein an orientation of a camera installed in the mobile camera apparatus is configured to be variable, wherein the receiver receives first and second image data from the mobile camera apparatus whose orientation of the camera is configured to be variable, calculate the relative position of the reference point marker to the mobile camera apparatus at a time when the first image data is captured, based on the reference point marker included in the first image data captured by the camera at a first orientation; and calculate the relative position of the article marker to the mobile camera apparatus at a time the second image data is captured, based on the article marker included in the second image data captured by the camera at a second orientation; and identify the position of the article using the relative position of the reference point marker, the relative position of the article marker, and a difference in orientations between the first and second orientations of the camera.

\* \* \* \* \*